United States Patent
Yamamuro et al.

(10) Patent No.: US 10,223,624 B2
(45) Date of Patent: Mar. 5, 2019

(54) NOTIFICATION DEVICE, NOTIFICATION METHOD, AND PRINTING APPARATUS

(71) Applicant: CANON KABUSHIKI KAISHA, Tokyo (JP)

(72) Inventors: Tomoki Yamamuro, Kawasaki (JP); Atsushi Arai, Yokohama (JP); Tatsuaki Orihara, Tokyo (JP); Ryo Shimamura, Yokohama (JP); Akira Shiba, Machida (JP); Kazuya Yoshii, Yokohama (JP); Norihiro Ikebe, Kawasaki (JP); Takeho Miyashita, Yokohama (JP); Masatoshi Ohira, Fujisawa (JP); Hirofumi Okuhara, Tokyo (JP); Kazumasa Matsushita, Kawasaki (JP); Misato Furuya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/485,658

(22) Filed: Apr. 12, 2017

(65) Prior Publication Data
US 2017/0320343 A1    Nov. 9, 2017

(30) Foreign Application Priority Data
May 6, 2016   (JP) ................................. 2016-093327

(51) Int. Cl.
*G06K 15/00*      (2006.01)
*B41J 2/175*      (2006.01)
(Continued)

(52) U.S. Cl.
CPC ...... *G06K 15/4075* (2013.01); *B41J 2/16508* (2013.01); *B41J 2/16532* (2013.01);
(Continued)

(58) Field of Classification Search
CPC ..................................................... B41J 2/17566
See application file for complete search history.

(56) References Cited

U.S. PATENT DOCUMENTS

| 5,280,310 | A | 1/1994 | Otsuka et al. |
| 5,359,355 | A | 10/1994 | Nagoshi et al. |
| (Continued) |

FOREIGN PATENT DOCUMENTS

JP     2002-234186 A     8/2002

OTHER PUBLICATIONS

U.S. Appl. No. 15/469,831, filed Mar. 27, 2017. Applicant: Tsuyoshi Ibe, et al.

*Primary Examiner* — Shelby L Fidler
(74) *Attorney, Agent, or Firm* — Venable LLP

(57) ABSTRACT

A notification device can suppress the occurrence of a user's mistake in supplementing a printing liquid. An acquisition unit that acquires information relating to a residual amount of each of a plurality of printing liquids supplied to a printing apparatus and a determination unit that determines whether or not each of the plurality of printing liquids is a printing liquid of a notification target of which a residual amount is a predetermined amount or less based on the acquired information are included. In addition, a notification unit that, in a case where a plurality of printing liquids of the notification target determined by the determination unit are present, notifies of information relating to the residual amount of a predetermined printing liquid is included. This notification unit performs a notification with priority for a predetermined printing liquid satisfying a predetermined condition among the plurality of printing liquids of the notification target.

18 Claims, 14 Drawing Sheets

(51) Int. Cl.
  *B41J 29/38* (2006.01)
  *G06K 15/10* (2006.01)
  *G06F 3/12* (2006.01)
  *B41J 2/165* (2006.01)

(52) U.S. Cl.
  CPC ......... *B41J 2/1752* (2013.01); *B41J 2/17509* (2013.01); *B41J 2/17553* (2013.01); *B41J 2/17566* (2013.01); *B41J 29/38* (2013.01); *G06F 3/1219* (2013.01); *G06K 15/005* (2013.01); *G06K 15/102* (2013.01)

(56) References Cited

U.S. PATENT DOCUMENTS

| | | | |
|---|---|---|---|
| 5,477,248 A | 12/1995 | Sugimoto et al. | |
| 5,481,281 A | 1/1996 | Otsuka et al. | |
| 5,502,464 A | 3/1996 | Takahashi et al. | |
| 5,818,471 A * | 10/1998 | Shimamura | B41J 2/17566 347/7 |
| 5,943,073 A | 8/1999 | Otsuka et al. | |
| 5,949,447 A | 9/1999 | Arai et al. | |
| 5,956,054 A | 9/1999 | Hirabayashi et al. | |
| 5,975,673 A | 11/1999 | Ohtsuka et al. | |
| 5,992,971 A | 11/1999 | Takahashi et al. | |
| 6,070,958 A * | 6/2000 | Kanome | B41J 2/1652 347/19 |
| 6,149,259 A | 11/2000 | Otsuka et al. | |
| 6,264,312 B1 | 7/2001 | Koitabashi et al. | |
| 6,394,571 B1 | 5/2002 | Yano et al. | |
| 6,951,382 B2 | 10/2005 | Inui et al. | |
| 8,231,216 B2 | 7/2012 | Yamamuro et al. | |
| 8,550,606 B2 | 10/2013 | Ikebe et al. | |
| 8,651,614 B2 | 2/2014 | Sakamoto et al. | |
| 8,864,266 B2 | 10/2014 | Suzuki et al. | |
| 8,979,238 B2 | 3/2015 | Nishikori et al. | |
| 9,016,821 B2 | 4/2015 | Masuda et al. | |
| 9,108,403 B2 | 8/2015 | Kawatoko et al. | |
| 2006/0132555 A1* | 6/2006 | Uehara | B41J 2/17503 347/85 |
| 2006/0215206 A1* | 9/2006 | Tamura | G06K 15/00 358/1.14 |
| 2012/0050359 A1* | 3/2012 | Koganehira | B41J 2/17509 347/6 |
| 2012/0274951 A1 | 11/2012 | Nishikori et al. | |

* cited by examiner

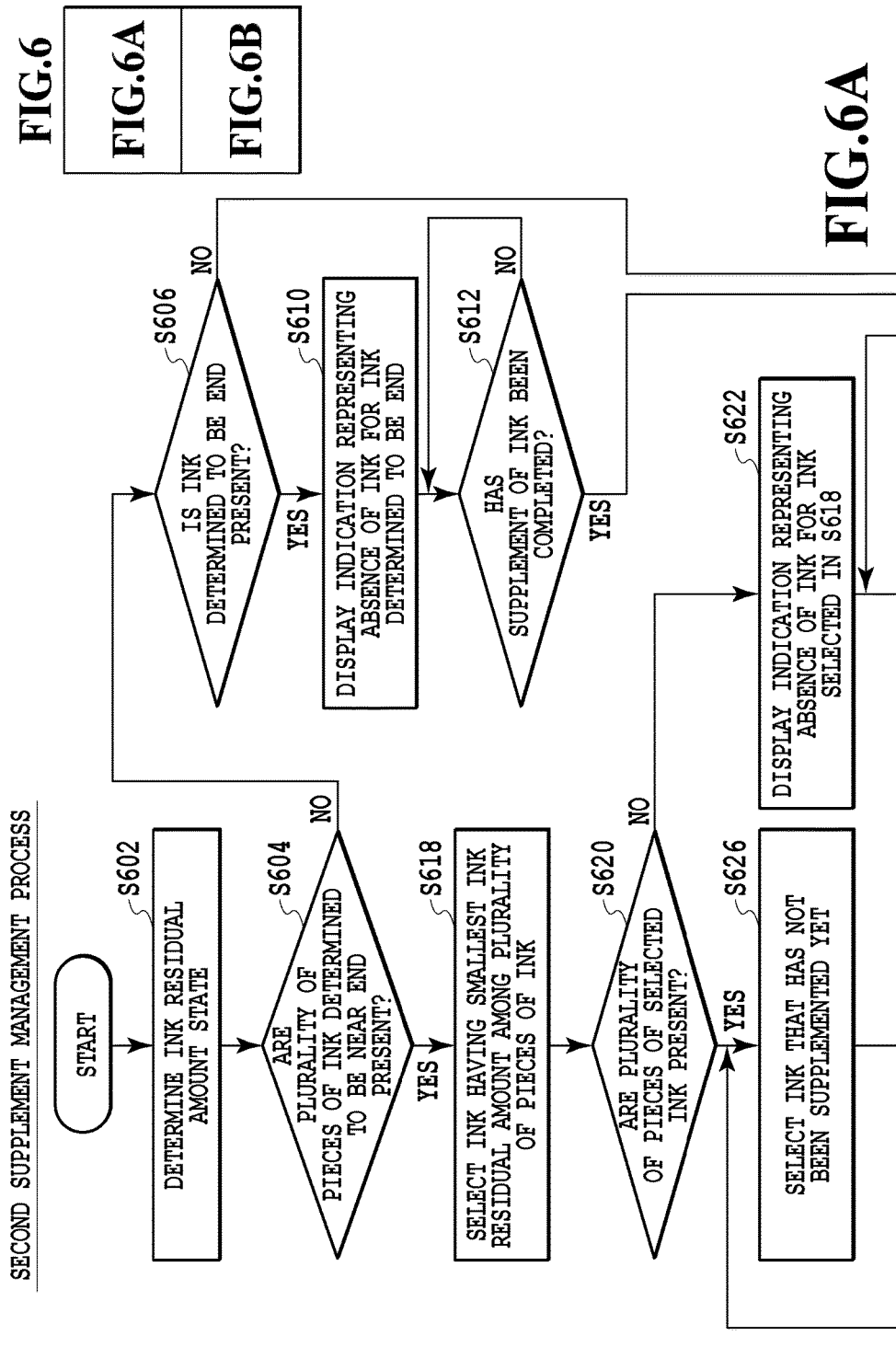

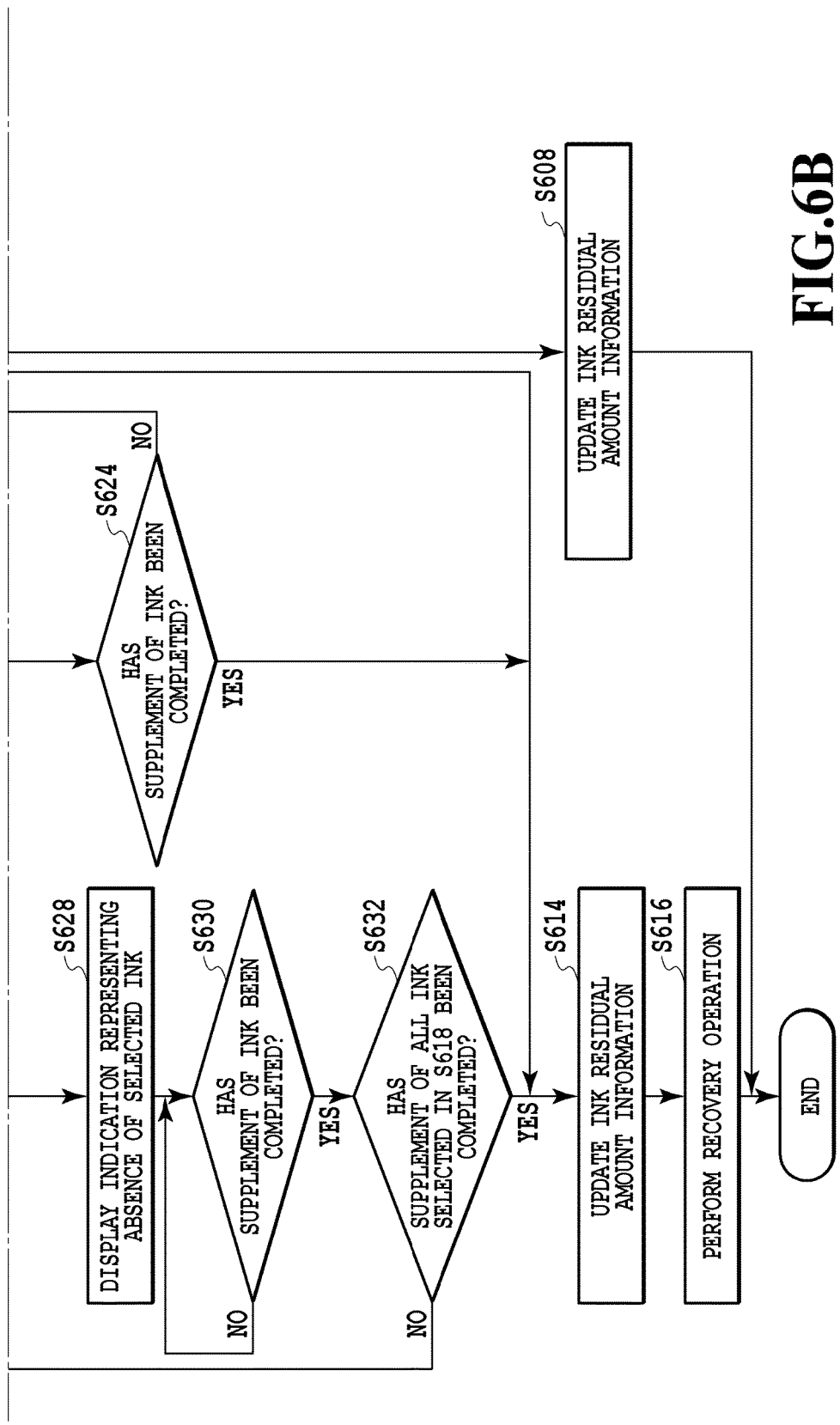

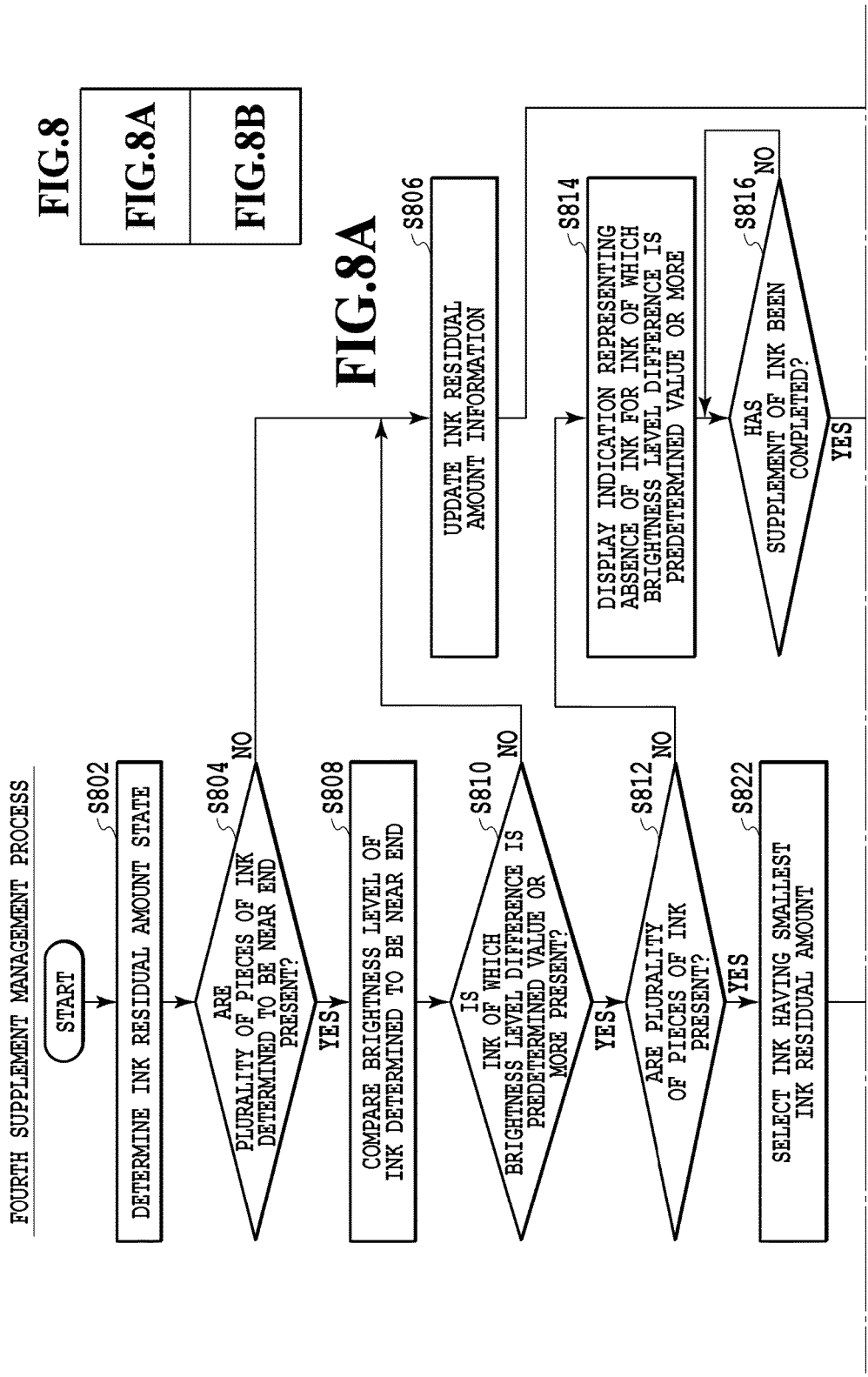

NOTIFICATION DEVICE, NOTIFICATION METHOD, AND PRINTING APPARATUS

BACKGROUND OF THE INVENTION

Field of the Invention

The present invention relates to a notification device and a notification method capable of suppressing a supplement mistake (erroneous supplement) according to a mistake of inserting a plurality of printing liquids such as ink and a printing apparatus including the notification device.

Description of the Related Art

In ink jet printing apparatuses printing images using a plurality of colors of ink, when ink of each color is supplemented, there is a possibility of a supplement mistake of misplacing ink to be supplemented. As a countermeasure for such a supplement mistake of ink, a technology disclosed in Japanese Patent Laid-Open No. 2002-234186 is known. In Japanese Patent Laid-Open No. 2002-234186, it is described to prevent a supplement mistake of ink by configuring an entry port of a tank supplying ink to a printing head to have a shape different for each color to prevent erroneous installation of a supplement tank.

SUMMARY OF THE INVENTION

In the first aspect of the present invention, there is provided a notification device comprising: an acquisition unit that acquires information relating to a residual amount of each of a plurality of printing liquids supplied to a printing apparatus; a determination unit that determines whether or not each of the plurality of printing liquids is a printing liquid of a notification target of which a residual amount is a predetermined amount or less based on the information acquired by the acquisition unit; and a notification unit that, in a case where a plurality of printing liquids of the notification target determined by the determination unit are present, notifies of information relating to the residual amount of a predetermined printing liquid satisfying a predetermined condition among the plurality of printing liquids of the notification target.

In the second aspect of the present invention, there is provided a notification method comprising: acquiring information relating to a residual amount of each of a plurality of printing liquids supplied to a printing apparatus; determining whether or not each of the plurality of printing liquids is a printing liquid of a notification target of which a residual amount is a predetermined amount or less based on the information acquired in the acquiring of information; and notifying of information relating to the residual amount of a predetermined printing liquid satisfying a predetermined condition among the plurality of printing liquids of the notification target in a case where a plurality of printing liquids of the notification target determined by the determining of whether or not each of the plurality of printing liquids is the printing liquid are present.

In the third aspect of the present invention, there is provided a printing apparatus performing printing by applying a printing liquid onto a printing medium, the printing apparatus comprising a notification device, wherein the notification device includes: an acquisition unit that acquires information relating to a residual amount of each of a plurality of supplied printing liquids; a determination unit that determines whether or not each of the plurality of printing liquids is a printing liquid of a notification target of which a residual amount is a predetermined amount or less based on the information acquired by the acquisition unit; and a notification unit that, in a case where a plurality of printing liquids of the notification target determined by the determination unit are present, notifies of information relating to the residual amount of a predetermined printing liquid satisfying a predetermined condition among the plurality of printing liquids of the notification target.

Further features of the present invention will become apparent from the following description of exemplary embodiments with reference to the attached drawings.

BRIEF DESCRIPTION OF THE DRAWINGS

FIG. 6 is a diagram showing a relation between FIGS. 6A and 6B;

FIGS. 6A and 6B are flowcharts that illustrate a process routine of a second supplement management process;

FIG. 8 is a diagram showing a relation between FIGS. 8A and 8B;

FIGS. 8A and 8B are flowcharts that illustrate a process routine of a fourth supplement management process;

DESCRIPTION OF THE EMBODIMENTS

According to a technology disclosed in Japanese Patent Laid-Open No. 2002-234186, since the shape of an entry port of a tank needs to be formed to be different for each color of ink, the structure is complicated, and there is a new problem in that the manufacturing cost is high.

The present invention provides a notification device, a notification method, and a printing apparatus capable of suppressing the occurrence of user's mistake in supplement of a printing liquid without incurring a high cost.

Hereinafter, examples of a notification device, a notification method, and a printing apparatus according to the present invention will be described in detail with reference to the attached drawings.

First Embodiment

Figure 1A:
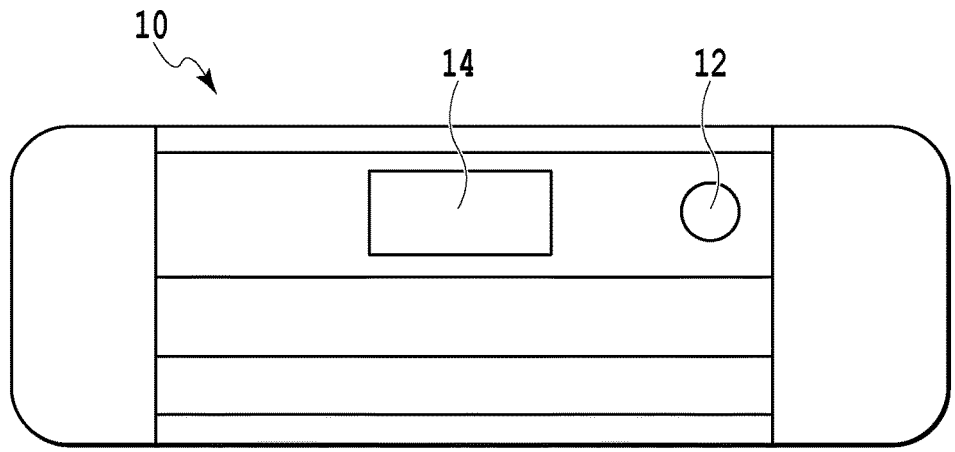
FIG. 1A is a front view of an ink jet printing apparatus according to the present invention.
Figure 1B:
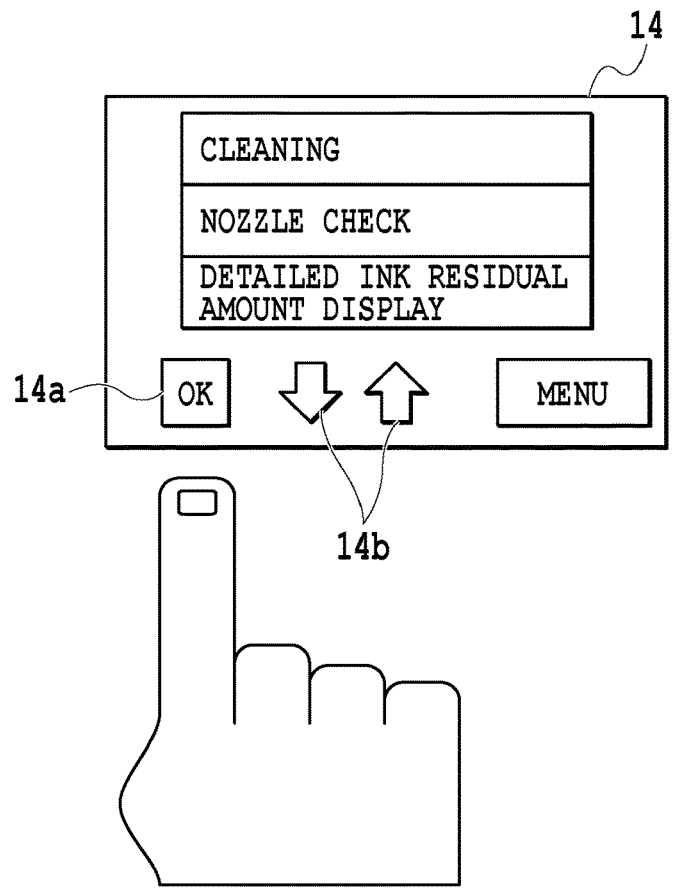
FIG. 1B is a schematic diagram that illustrates an example of display of a display panel.

First, an ink jet printing apparatus according to a first embodiment of the present invention will be described with reference to FIGS. 1A to 5. The ink jet printing apparatus 10, as illustrated in FIG. 1A, includes a power supply 12 used for operating or stopping the ink jet printing apparatus 10 and a display panel 14 displaying various kinds of information for a user. The display panel 14, for example, is a touch panel. Accordingly, as illustrated in FIG. 1B, the user can perform various operations such as cleaning, printing of a nozzle check pattern, and display of a residual amount by selecting an OK button 14a or an arrow button 14b displayed on the display panel 14 by using a finger.

Figure 2A:
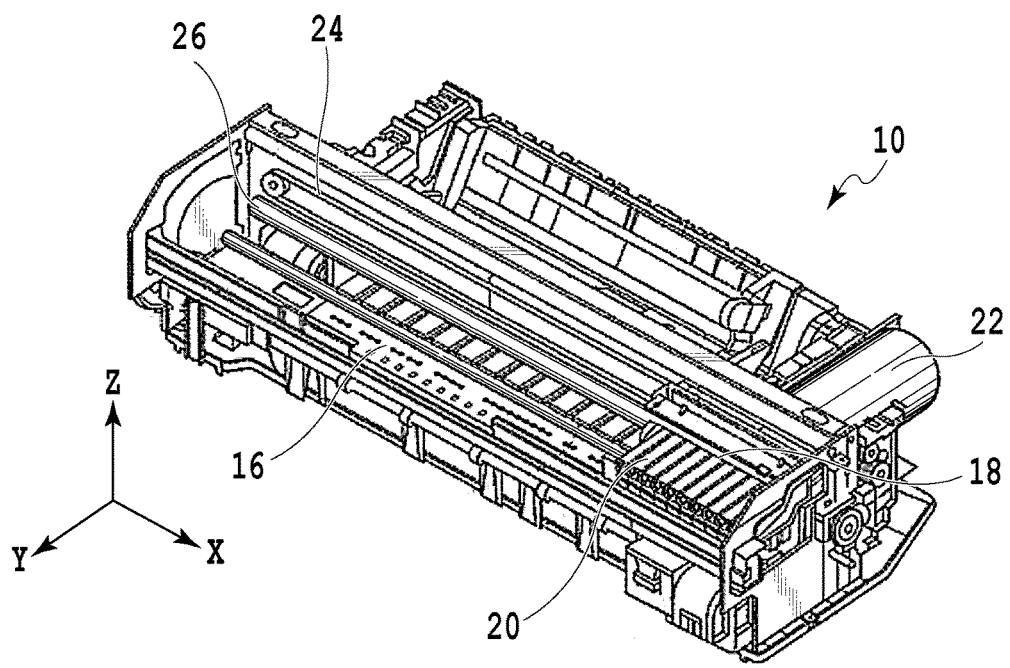
FIG. 2A is a schematic configuration perspective view of the ink jet printing apparatus illustrated in FIG. 1A that is in a casing-detached state.

The ink jet printing apparatus 10, as illustrated in FIG. 2A, includes a platen 16 that supports a printing medium M conveyed in a Y-axis direction and a carriage 18 that is arranged to be movable in an X-axis direction intersecting (in this embodiment, orthogonal to) the Y-axis direction. In the carriage 18, a printing head 20 is arranged such that a nozzle face 20a in which nozzles (not illustrated in the drawing) ejecting ink are formed faces the platen 16. At this time, the nozzle face 20a of the printing head 20 is arranged to maintain a predetermined distance from the platen 16 in a Z-axis direction (height direction) intersecting the X-axis direction and the Y-axis direction. In addition, the carriage 18 is configured to reciprocate on a guide shaft 26 extending in the X-axis direction through a belt 24 by driving a motor 22.

Figure 2B:
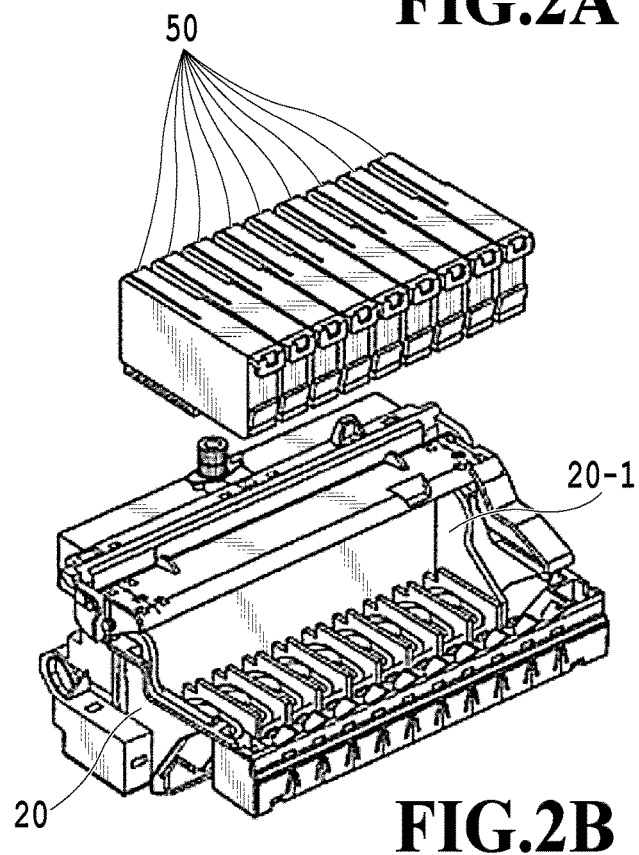
FIG. 2B is a schematic configuration perspective view of a printing head that is in an ink-tank excluded state.

In the printing head 20, as illustrated in FIG. 2B, nine ink tanks 50 storing different colors of ink are arranged to be independently attachable to/detachable from a head cartridge 20-1 (housing unit). The head cartridge 20-1 may have a configuration in which two to eight or ten or more ink tanks are attachable or detachable. In the nine ink tanks 50, for example, ink (printing liquids) of cyan, magenta, yellow, black, red, light cyan, light magenta, grey, and clear is stored.

Figure 3A:
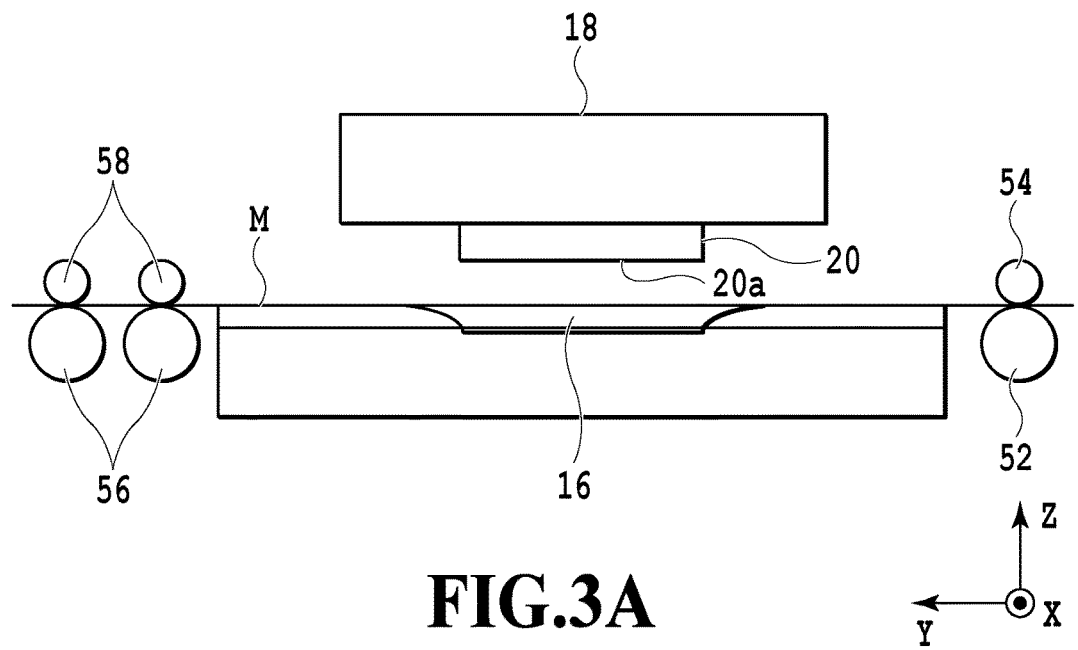
FIG. 3A is a cross-sectional view of a section of a main part near a platen of the ink jet printing apparatus illustrated in FIG. 1A.

In addition, as illustrated in FIG. 3A, on the upstream side of the platen 16 in the Y-axis direction, a conveyance roller 52 and a pinch roller 54 are arranged, and, on the downstream side, a sheet discharge roller 56 and a spur roller 58 are arranged. A printing medium M conveyed in the Y-axis direction has the upstream side thereof pinched by the conveyance roller 52 and the pinch roller 54 and the downstream side pinched by the sheet discharge roller 56 and the spur roller 58 and maintains a smooth face.

In the ink jet printing apparatus 10, when the printing head 20 moves in the X-axis direction through the carriage 18, ink is ejected from nozzles (not illustrated in the drawing) of the nozzle face 20a, and an image corresponding to one printing scan is printed in the printing medium M. Next, the conveyance roller 52 and the sheet discharge roller 56 are driven by a motor (not illustrated in the drawing), and the printing medium M is conveyed from the upstream side to the downstream side in the Y-axis direction by a predetermined amount. Accordingly, at a position on the printing medium M that faces the printing head 20, an area in which nothing has been printed yet is located. Thereafter, when the printing head 20 moves in the X-axis direction through the carriage 18, ink is ejected from the nozzles (not illustrated in the drawing), and printing is performed for the area. By repeatedly performing such a series of operations, a printing operation for the printing medium M is performed in the ink jet printing apparatus 10.

Figure 3B:
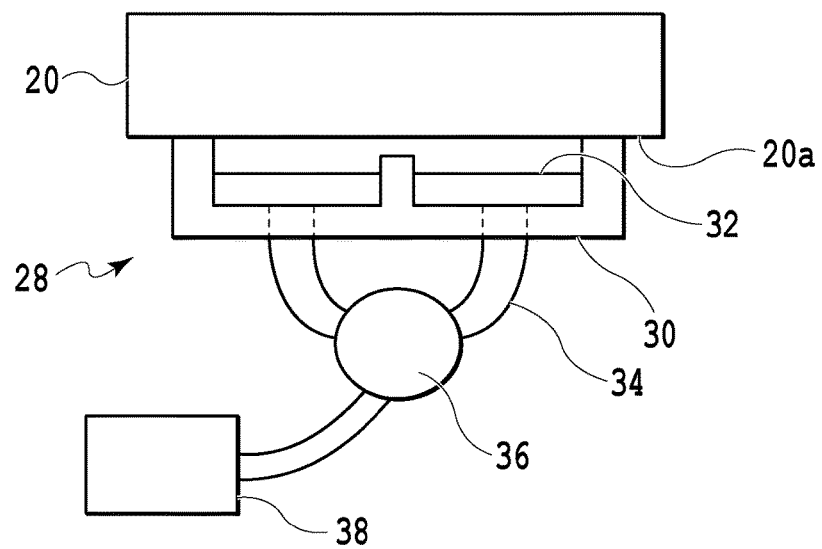
FIG. 3B is a schematic diagram that illustrates a state in which a printing head and a recovery unit are in contact with each other.

In addition, in the ink jet printing apparatus 10, a recovery unit 28 is arranged on one end side in the X-axis direction (in FIG. 2A, on a lower side on which the printing head 20 is located). The recovery unit 28 performs a recovery operation for the printing head 20 at predetermined timing such as after supplement of ink such that nozzles (not illustrated in the drawing) of the printing head 20 can normally eject ink. In the recovery unit 28, a cap 30 having an ink absorber 32 on the inside thereof is brought into tight contact with the nozzle face 20a. At this time, as illustrated in FIG. 3B, the ink absorber 32 faces the nozzle face 20a and forms a minute gap from the nozzle face 20a. Then, when a pump 36 arranged through a tube 34 connected to the cap 30 is driven, negative pressure is generated in a sealed space formed by the nozzle face 20a and the cap 30, and ink is sucked. In addition, the sucked ink is collected into a waste ink pack 38. According to the recovery operation performed by the recovery unit 28, adhesion of ink inside the nozzles (not illustrated in the drawing) is prevented, and mixing of bubbles can be resolved.

Figure 4:
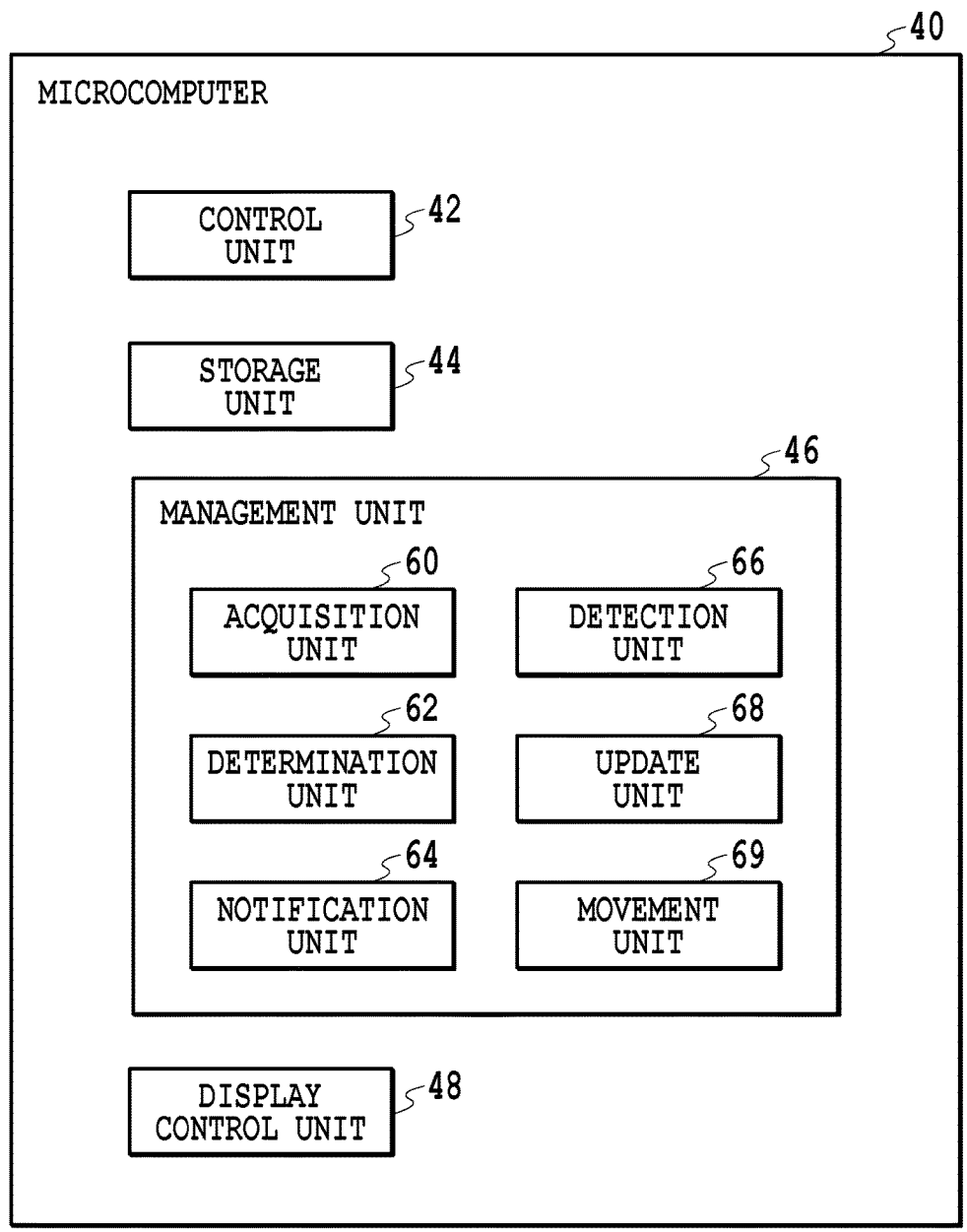
FIG. 4 is a schematic diagram that illustrates the functional configuration of a microcomputer.
Figure 5:
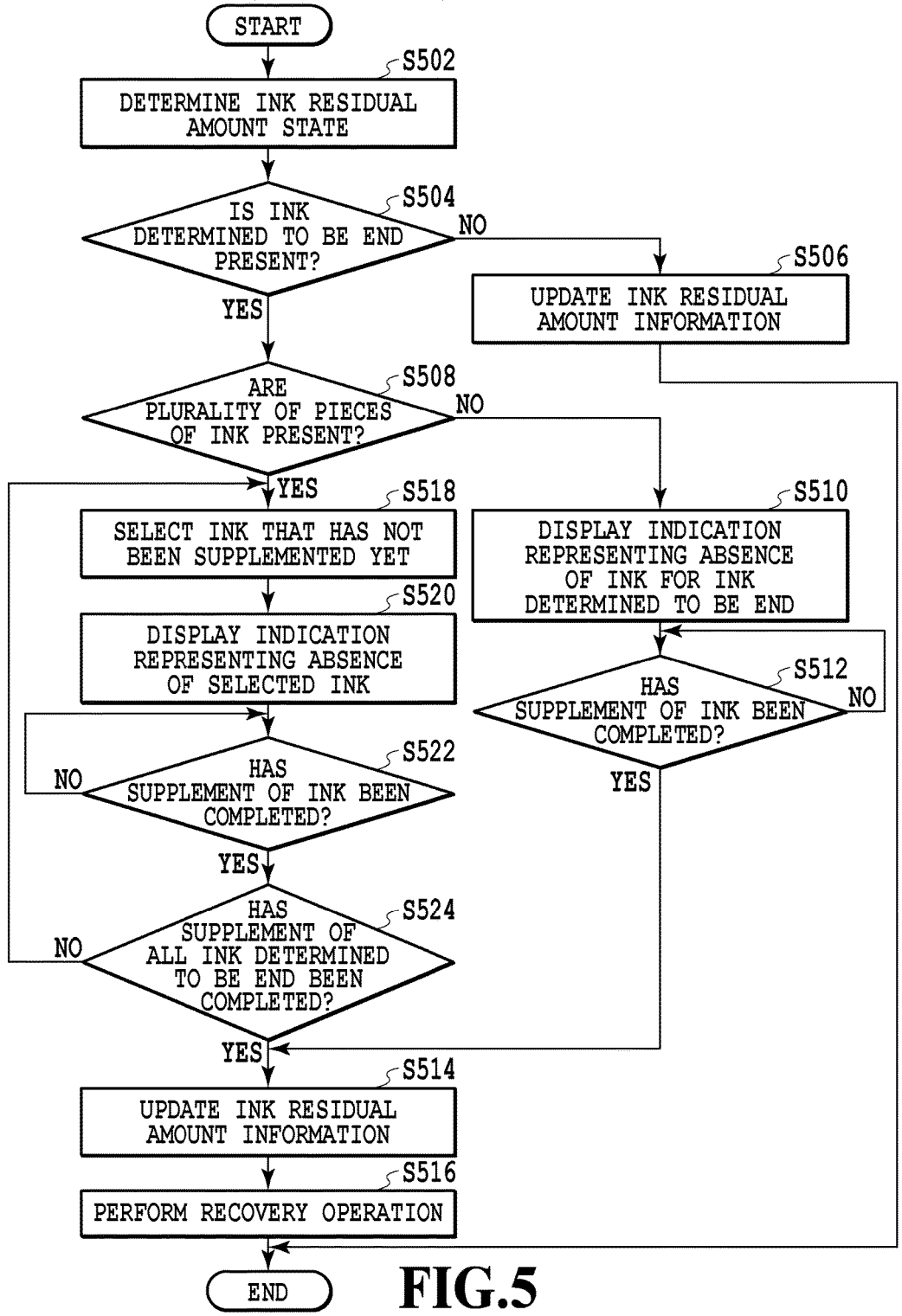
FIG. 5 is a flowchart that illustrates a process routine of a first supplement management process.

The overall operation of the ink jet printing apparatus 10 is controlled by a built-in microcomputer 40. The microcomputer 40, as illustrated in FIG. 4, includes a control unit 42 that controls the operation of each constituent member to perform a printing operation and a recovery operation and a storage unit 44 that stores various kinds of data such as image data to be printed. In addition, the microcomputer 40 includes a management unit that manages a residual amount of ink including calculation of information (hereinafter, simply referred to as a "residual amount" as is appropriate) relating to the residual amount of ink in the ink tank 50 and a display control unit 48 that controls the display panel 14.

The management unit 46 includes an acquisition unit 60 that acquires an ink residual amount of the inside of the ink tank 50 and a determination unit 62 that determines an "end" (to be described later) or a "near end" (to be described later) based on the ink residual amount acquired by the acquisition unit 60. In addition, the management unit 46 includes a notification unit 64 that outputs notification information to be displayed on the display panel 14 to the display control unit 48 based on a result of the determination performed by the determination unit 62, a detection unit 66 that detects completion of an ink supplement operation, and an update unit 68 that updates ink residual amount information. Furthermore, the management unit 46 includes a movement unit 69 that moves the printing head 20 to a supplement position that is a position at which ink supplement can be performed by a user.

In more detail, the acquisition unit 60 calculates and acquires the residual amount of ink inside each ink tank 50 mounted in the printing head 20 at predetermined timing. As a method for the calculation, for example, when a printing operation or a recovery operation is performed, based on printing data representing an image to be printed or the type of recovery operation, dot counting of the number of issuance is performed for all the used ink. Thereafter, a count value is multiplied by an ejection amount corresponding to one dot, whereby a consumed amount of each ink is calculated. Then, the calculated consumed amount of the ink is subtracted from an ink residual amount (stored in the storage unit 44) of time before the printing operation or the recovery operation, whereby the residual amount of the ink inside the ink tank 50 is calculated.

The determination unit 62 determines the state of a residual amount of ink based on whether or not the ink residual amount is a predetermined amount or less. In other words, for all the used ink, an ink residual amount state is determined based on the ink residual amount acquired by the acquisition unit 60 and an initial storage amount, which is the amount of ink initially stored in the ink tank 50, stored in the storage unit 44. The initial storage amount is a storage amount of the ink tank 50 as a new product. More specifically, for example, when the ink residual amount is 20% of the initial storage amount or less, an ink residual amount state of the "near end" representing that the ink disappears soon is determined. In addition, when the ink residual amount is 0% of the initial storage amount or less (in other words 0%), an ink residual amount state of the "end" representing that the ink has disappeared is determined. Here, thresholds used for determining the "end" and the "near end" may be set to be different for each ink.

The notification unit 64 determines ink determined to be the end as ink (a printing liquid that is a first notification target) of a notification target and outputs information (including a display direction of a notification urging the supplement of ink or the like) relating to the residual amount of the ink to the display control unit 48. More specifically, the notification unit outputs information (for example, color information) specifying ink, a residual amount of ink, a display direction of a notification urging the supplement of ink, a supplement operation completion button (to be described later) or the like to the display control unit 48 as notification information. The display control unit 48 performs display based on input notification information. More specifically, based on the information specifying ink and the ink residual amount, a predetermined ink residual amount is displayed on the display panel 14. In addition, the ink residual amount displayed on the display panel 14 may be display from which a user can intuitively understand an increase/decrease in the ink residual amount and thus may be % display using a numerical value or display using a figure. In addition, on the display panel 14, display indicating that ink is absent is performed for predetermined ink based on the information specifying ink and a display direction of a notification urging the supplement of the ink. For example, in a case where display indicating that ink is absent is performed for ink A, words such as "There is no residual amount of ink A. Please supplement ink A." are displayed on the display panel 14. In addition, on the display panel 14, based on a display direction of the supplement operation completion button, the supplement operation completion button used for detecting the completion of the supplement operation of ink is displayed.

In addition, for example, in a case where a plurality of pieces of ink determined to be the end are present, the notification unit 64, first, outputs the information specifying one piece of ink and a display direction of a notification urging the supplement of the ink to the display control unit 48 as notification information. Thereafter, when the completion of the supplement operation is detected by the detection unit 66, similar notification information for another piece of ink is output. Then, such a process is repeatedly performed until notification information of all the ink determined to be the end is output. In addition, in this case, the order of supplement is determined for a plurality of pieces of ink determined to be the end, and a display direction of the determined order may be output together with the other notification information. In addition, the display of a residual amount of ink, a notification urging the supplement of ink, and the like is not limited to the display panel 14 but may be displayed in a display device (not illustrated in the drawing) connected to a personal computer (not illustrated in the drawing) that is separately installed. Furthermore, in this embodiment, while a notification urging the supplement of ink is displayed through the display panel 14, for example, the notification may be performed using voice guidance or a warning sound through a speaker. Alternatively, the notification may be performed using a lighting pattern or the like by using a light source such as an LED lamp. In such a case, a configuration capable of detecting the completion of supplement needs to be arranged. In addition, the notification may be performed by combining the techniques described above. Accordingly, the notification unit 64 is a notification unit that causes a notification device such as the display panel 14, a speaker, or a light source to perform the urging of the supplement of ink.

When an ink supplement operation, in other words, a replace operation of the ink tank 50 has been completed, a user selects the supplement operation completion button displayed on the display panel 14. Information representing the selection of the supplement operation completion button is output from the display control unit to the detection unit 66, and, accordingly, it is determined by the detection unit 66 that the supplement operation has been completed.

The update unit 68, based on an ink residual amount or an ink residual amount after the supplement acquired by the acquisition unit 60, updates the ink residual amount information by changing the residual amount of each ink stored in the storage unit 44. In addition, since the printing head 20 supplements ink by replacing the ink tank 50, the ink residual amount after the supplement is an initial storage amount.

When a display direction of a notification urging the supplement of ink is output from the notification unit 64 as notification information, the movement unit 69 moves the printing head 20 to a supplement position. In addition, when the completion of the supplement operation is detected by the detection unit 66, the printing head 20 is moved to a recovery position that is a position at which a recovery operation can be performed by the recovery unit 28. Then, when the printing head 20 is moved to the recovery position, the recovery operation is performed by the control unit 42.

In the configuration described above, in the ink jet printing apparatus 10, a first supplement management process performing a notification of ink supplement is started at predetermined timing such as timing after a printing start direction or timing after the completion of a printing operation. In addition, a direction of printing start, for example, is input from a personal computer (not illustrated in the drawing) that is separately disposed. Here, in a flowchart illustrated in FIG. 5, a detailed processing content of this first supplement management process is represented. In the first supplement management process, first, an ink residual amount of each ink tank 50 is calculated, and an ink residual amount state of each ink is determined based on the ink residual amount (Step S502). Next, it is determined whether or not ink determined to be the end is present (Step S504). In Step S504, in a case where it is determined that ink determined to be the end is not present, the ink residual amount information is updated (Step S506), and the first supplement management process ends. In addition, in Step S504, in a case where it is determined that ink determined to be the end is present, it is determined whether or not a plurality of pieces of ink determined to be the end are present (Step S508).

In Step S508, in a case where it is determined that a plurality of pieces of ink determined to be the end are not present, in other words, only one piece of ink determined to be the end is present, an indication representing that ink is absent for the ink determined to be the end is displayed on the display panel 14 (Step S510). In addition, in Step S510, additionally, the supplement operation completion button is displayed, and the printing head 20 is moved to a supplement position. Next, it is determined whether or not the supplement of ink has been completed (Step S512). In other words, in Step S512, it is determined whether or not the supplement operation completion button displayed on the display panel 14 is selected. In Step S512, in a case where it is determined that the supplement of ink has not been completed, in other words, the supplement operation completion button is selected, Step S512 is repeatedly performed. In addition, in Step S512, in a case where it is determined that the supplement of ink has been completed, in other words, the supplement completion button is selected, the ink residual amount information is updated (Step S514). At this time, display representing that ink is absent, which is displayed on the display panel 14, is erased. Thereafter, the printing head 20 is moved up to a recovery position through the carriage 18, and the inside of the printing head 20 is filled with ink by the recovery operation (Step S516), and the first supplement management process ends.

On the other hand, in Step S508, in a case where it is determined that a plurality of pieces of ink determined to be the end are present, among the plurality of pieces of ink determined to be the end, ink that has not been supplemented yet is selected (S518). At this time, the selected ink is stored as ink that has been completed to be selected. Thereafter, an indication representing that ink is absent for the selected ink is displayed on the display panel 14 (Step S520). In addition, in Step S520, the supplement operation completion button is additionally displayed, and the printing head 20 is moved up to the supplement position. Next, it is determined whether the supplement of ink has been completed (Step S522). In addition, a specific processing content of Step S522 is similar to that of Step S512.

In Step S522, in a case where it is determined that the supplement of ink has not been completed, Step S522 is repeatedly performed. On the other hand, in Step S522, in a case where it is determined that the supplement of ink has been completed, it is determined whether or not the supplement of all the ink determined to be the end has been completed (Step S524). In other words, in Step S524, it is determined whether the selection has been completed in Step S518 for all the ink determined to be the end. In Step S524, in a case where it is determined that the supplement of all the ink determined to be the end has not been completed, in other words, in a case where it is determined that a state in which the selection of all the ink determined to be the end has been completed is not formed, the process is returned to Step S518, and a subsequent process is performed. On the other hand, in Step S524, in a case where it is determined that the supplement of all the ink has been completed, in other words, all the ink determined to be the end has been selected, the process proceeds to Step S514. Then, when the ink residual amount information is updated, the process proceeds to Step S516, a recovery operation is performed, and the first supplement management process ends.

In addition, in the first supplement management process, the brightness of each color of ink is stored in the storage unit 44, and, for ink determined to be the end, in order of ink having highest brightness to ink having lowest brightness, an indication representing the absence of ink may be displayed. More specifically, in this case, in Step S518, among ink that has not been yet supplemented, ink having highest brightness is selected. In this way, when a plurality of pieces of ink need to be supplemented, for example, also in a case where ink (for example, a small amount of ink scattering at the time of supplement) that is previously supplemented is mixed, the influence of the mixed color is low.

In addition, in the first supplement management process, it may be configured such that the arrangement position of the ink tank 50 in a head cartridge 20-1 is stored, and, for pieces of ink of which the arrangement positions of the ink tanks 50 are separate from each other by a predetermined distance or more, the supplement of the pieces of ink may be simultaneously urged. Since the ink tanks 50 supplementing ink are separate from each other by the predetermined distance, it is difficult for a user to make a mistake in replacement of the ink tanks 50. In addition, in the first supplement management process, it may be configured such that a priority level of order of the supplement for each ink is stored, and one ink is selected based on the priority levels. More specifically, in Step S518, based on the priority levels stored in the storage unit 44, ink is selected.

As described above, the ink jet printing apparatus 10 determines whether or not a plurality of pieces of ink determined to be the end are present. Then, in a case where it is determined that a plurality of pieces of ink determined to be the end are present, the supplement of ink is urged sequentially one by one for the plurality of ink determined to be the end. In this way, after the completion of supplement of one piece of ink, the user supplements another ink, and it is difficult that erroneous supplement according to a mistake occurs.

In this way, the ink jet printing apparatus 10 manages timing at which a notification for urging the supplement is performed for the user is managed with the shape of each constituent member not changed. For this reason, according to the ink jet printing apparatus 10, compared to a form in which the occurrence of erroneous supplement is suppressed by changing the shape of the entry port for each color of ink, an increase in the cost can be suppressed. In addition, the occurrence of erroneous supplement of ink can be suppressed.

Second Embodiment

Next, an ink jet printing apparatus according to a second embodiment of the present invention will be described with reference to FIGS. 6A and 6B. In the following description, for a configuration that is the same as or corresponds to that of the ink jet printing apparatus 10, the reference numeral described above will be used, and detailed description thereof will not be presented as is appropriate.

The ink jet printing apparatus 70 according to this second embodiment is different from the ink jet printing apparatus 10 only in the following points. A notification unit 64 determines ink determined to be near end as ink (a printing liquid that is a second notification target) that is a notification target. Then, among a plurality of pieces of ink determined to be the near end, ink having a smallest ink residual amount is selected, and a display direction urging the supplement of the selected ink is performed. In addition, in a case where a plurality of pieces of ink having the smallest ink residual amount are present among the ink determined to be the near end, the notification unit 64 outputs a display direction urging the supplement of one piece of ink at each time while checking the completion of a supplement operation.

In the ink jet printing apparatus 70, a second supplement management process is started in which, at predetermined timing such as timing after a printing start direction or timing after completion of a printing operation, a notification of supplement of ink is performed. Here, in a flowchart illustrated in FIGS. 6A and 6B, a detailed processing content of this second supplement management process is illustrated. In the second supplement management process, first, an ink residual amount of each ink tank 50 is calculated, and an ink residual amount state of each ink is determined based on the ink residual amount (Step S602). Next, it is determined whether or not a plurality of pieces of ink determined to be the near end are present (Step S604).

In Step S604, in a case where it is determined that a plurality of pieces of ink determined to be the near end are not present, next, it is determined whether or not ink determined to be the end is present (Step S606). In Step S606, in a case where it is determined that ink determined to be the end is not present, ink residual amount information is updated (Step S608), and the second supplement management process ends. On the other hand, in Step S606, in a case where it is determined that ink determined to be the end is present, an indication representing that ink is absent for the ink determined to be the end is displayed on a display panel 14 (Step S610). A specific processing content of Step S610 is similar to that of Step S510.

Next, it is determined whether or not the supplement of ink has been completed (Step S612). A specific processing content of this Step S612 is similar to that of Step S512 described above. In a case where it is determined that the supplement of ink has not been completed in Step S612, Step S612 is repeatedly performed. On the other hand, in a case where it is determined that the supplement of ink has been completed in Step S612, ink residual amount information is updated (Step S614). At this time, display indicating that ink displayed on the display panel 14 is absent is removed. Thereafter, a recovery operation is performed (Step S616), and the second supplement management process ends. A specific processing content of Step S616 is similar to that of Step S516 described above.

In addition, in Step S604, in a case where it is determined that a plurality of pieces of ink determined to be the near end are present, ink of which the residual amount is smallest among the plurality of pieces of ink is selected (Step S618). Thereafter, it is determined whether or not a plurality of pieces of selected ink are present (Step S620). In Step S620, in a case where it is determined that a plurality of pieces of ink are not present, in other words, in a case where it is determined that only one piece of ink is present, an indication representing that ink is absent is displayed on the display panel 14 for the ink selected in Step S618 (S622). In addition, in Step S622, a supplement operation completion button is additionally displayed, and a printing head 20 is moved up to a supplement position. Then, it is determined whether or not the supplement of ink has been completed (Step S624). A specific processing content of Step S624 is similar to that of Step S512 described above. In Step S624, in a case where it is determined that the supplement of ink has not been completed, Step S624 is repeatedly performed. On the other hand, in Step S624, in a case where it is determined that the supplement of ink has been completed, the process proceeds to Step S614, and the ink residual amount information is updated. Thereafter, the process proceeds to Step S616, a recovery operation is performed, and the second supplement management process ends.

On the other hand, in Step S620, in a case where it is determined that a plurality of pieces of ink are present, ink that has not been supplemented is selected from among the plurality of pieces of ink selected in Step S618 (Step S626). At this time, the selected ink is stored as ink for which the selection has been completed. Then, an indication representing that the ink is absent is displayed for the ink selected in Step S626 on the display panel 14 (Step S628). In addition, in Step S628, the supplement operation completion button is additionally displayed, and the printing head 20 is moved up to the supplement position. Next, it is determined whether or not the supplement of ink has been completed (Step S630). A specific processing content of Step S630 is similar to that of Step S512.

In Step S630, in a case where it is determined that the supplement of ink has not been completed, Step S630 is repeatedly performed. On the other hand, in Step S630, in a case where it is determined that the supplement of ink has been completed, it is determined whether or not the supplement of all the ink selected in Step S618 has been completed (Step S632). In other words, in Step S632, it is determined whether or not a state is formed in which the selection has been completed in Step S626 for all the ink that has been selected in Step S618. In Step S632, in a case where it is determined that the supplement of all the ink selected in Step S618 has not been completed, in other words, in a case where it is determined that ink that has not been selected among the ink selected in Step S618 is present, the process is returned to Step S626, and a subsequent process is performed. In Step S632, in a case where it is determined that the supplement of all the ink selected in Step S618 has been completed, in other words, all the ink selected in Step S618 has been selected, the process proceeds to the process of Step S614. Then, the ink residual amount information is updated, the process proceeds to Step S616, and, after a recovery operation is performed, the second supplement management process ends.

In the second supplement management process, a condition for the selection in Step S618 is not limited to the selection of ink having a smallest ink residual amount. In other words, it may be configured such that an accumulated use amount of each ink at the time of a printing operation or the like is stored, and, for ink having a largest use amount or a highest use frequency, an indication representing that the ink is absent is displayed first. More specifically, in this case, in Step S618, ink having a largest use amount or a highest use frequency is selected. In addition, it may be configured such that brightness of each color of ink is stored in the storage unit 44, and, for ink having highest brightness, an indication representing that the ink is absent may be displayed first. More specifically, in this case, in Step S618, ink having highest brightness is selected. In addition, in a case where the brightness of each ink stored in the ink tank 50 is different, the process of Step S620 to Step S632 is omitted, and the process directly proceeds from Step S618 to Step S622.

In addition, in the second supplement management process, similar to the first supplement management process, for all the ink determined to be the near end (determined to be the end in the first supplement management process), display indicating that the ink is absent may be sequentially performed, whereby the user is urged to supplement the ink.

Figure 11A:
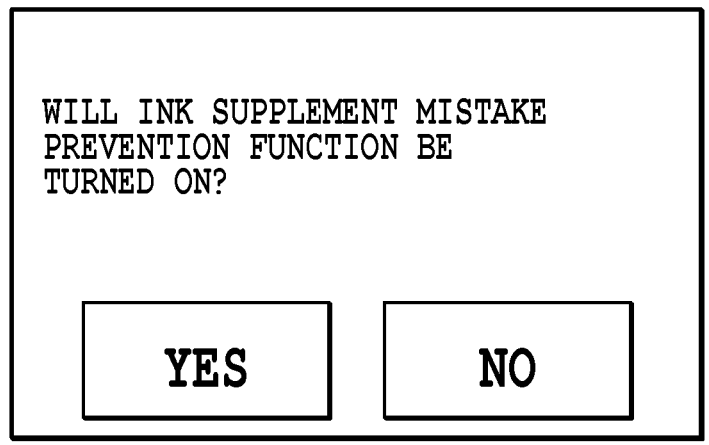
FIGS. 11A and 11B are schematic diagrams that illustrate examples of display of a display panel.
Figure 11B:
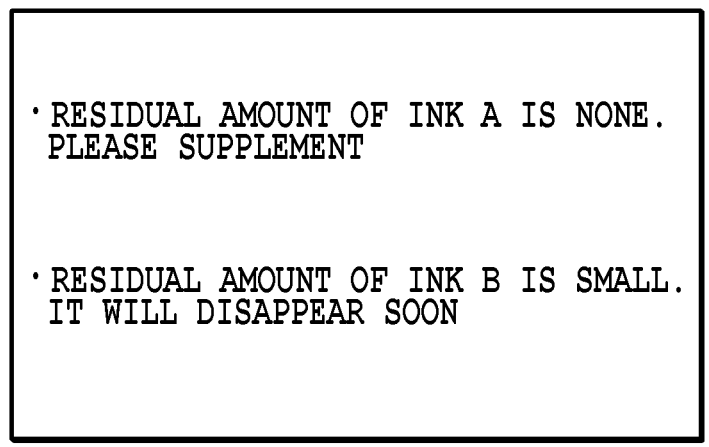

In addition, in the second supplement management process, in Step S628, for ink other than the ink having the smallest ink residual amount among a plurality of pieces of ink determined to be the near end, a display for a preliminary notice of supplement of ink may be displayed on the display panel 14. At this time, for ink for which a preliminary notice of supplement of ink is performed, only one piece of ink may be displayed based on a predetermined condition such as ink having a smallest amount ink, or a plurality of pieces of ink may be simultaneously displayed in order that is based on the predetermined condition. More specifically, out of two pieces of ink of A and B that are determined to be the near end, in a case where the ink residual amount of A is smaller, as illustrated in FIG. 11B, display (upper stage) indicating that ink is absent in A and display (lower stage) of a preliminary notice of absence of ink in B are performed. In this way, the user can recognize ink of which supplement timing is close. For this reason, at the time of actual supplement, the preparation for the supplement of the ink or the like has been completed, and a supplement operation can be quickly performed.

In addition, in the second supplement management process, it may be configured such that, immediately after Step S606, it is determined whether or not a plurality of pieces of ink determined to be the end are present, and, for the plurality of pieces of ink determined to be the end, an indication representing the absence of ink is displayed sequentially one each time. In addition, this specific process is a process similar to Steps S508 to S524 of the first supplement management process.

As described above, the ink jet printing apparatus 70 is configured to determine whether or not a plurality of pieces of ink determined to be the near end are present. Then, in a case where it is determined that a plurality of the ink is present, for ink having a smallest ink residual amount among the ink determined to be the near end, the supplement of the ink is urged first. Accordingly, a frequency at which a plurality of pieces of ink are simultaneously absent becomes low. For this reason, user's chance for simultaneously supplementing a plurality of pieces is decreased, and it is difficult for a supplement mistake of ink to occur.

In this way, the ink jet printing apparatus 70 manages timing at which the supplement of ink is urged with the shape of each constituent member not changed. For this reason, according to the ink jet printing apparatus 70, compared to a form in which the occurrence of erroneous supplement is suppressed by changing the shape of the entry port for each color of ink, an increase in the cost can be suppressed. In addition, the occurrence of erroneous supplement of ink can be suppressed.

Third Embodiment

Figure 7:
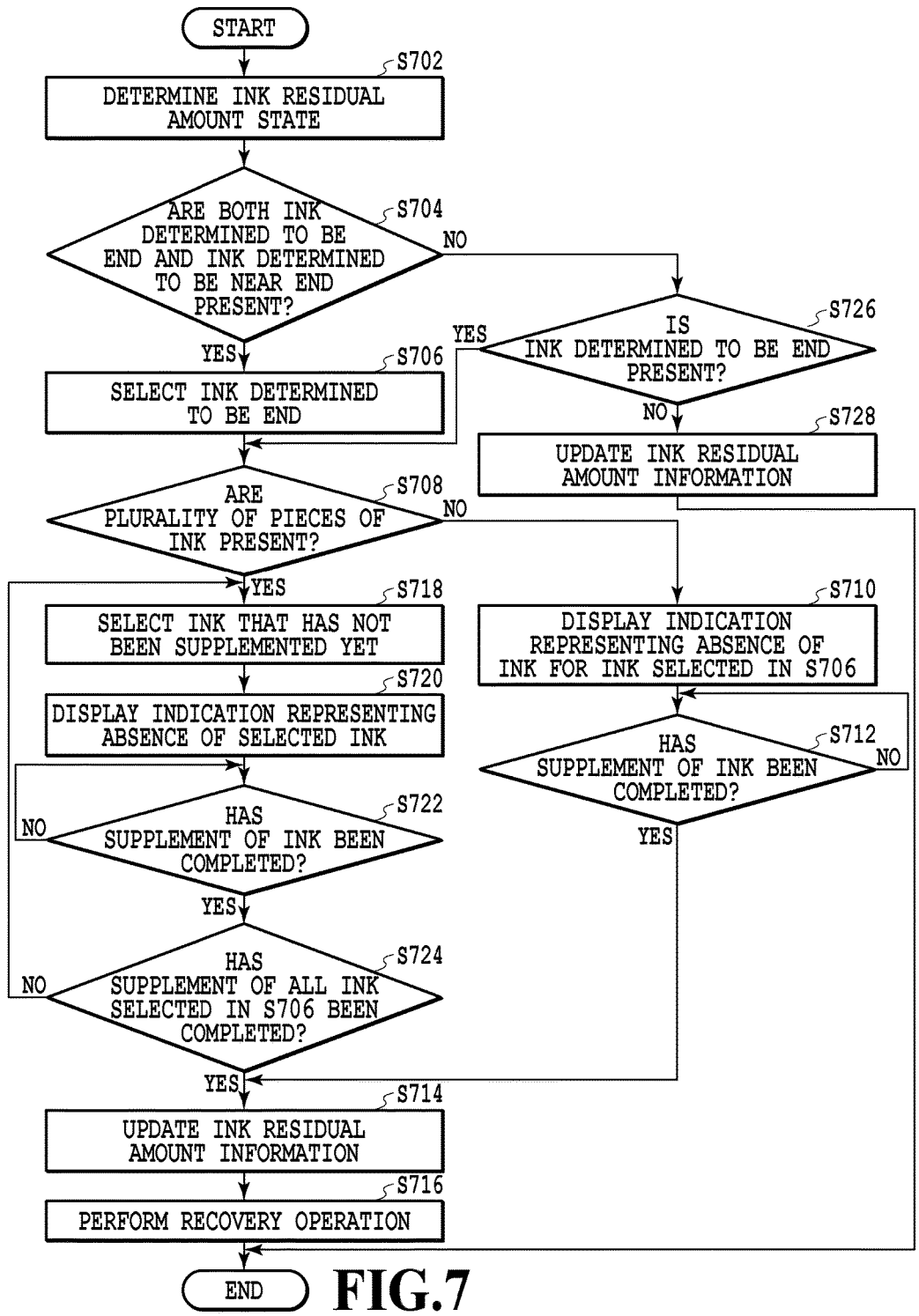
FIG. 7 is a flowchart that illustrates a process routine of a third supplement management process.

Next, an ink jet printing apparatus according to a third embodiment of the present invention will be described with reference to FIG. 7. In the following description, for a configuration that is the same as or corresponds to that of the ink jet printing apparatus 10 or 70, the reference numeral described above will be used, and detailed description thereof will not be presented as is appropriate.

The ink jet printing apparatus 80 according to this third embodiment is different from the ink jet printing apparatus 10 only in the following points. A notification unit 64 determines ink (a printing liquid that is a first notification target) determined to be end and ink (a printing liquid that is a second notification target) determined to be near end as ink that is a notification target. Then, in a case where both the ink determined to be the near end by the determination unit 62 and the ink determined to be the end are present, only the ink determined to be the end is selected, and a display direction urging the supplement of the ink determined to be the end is performed.

In the ink jet printing apparatus 80, a third supplement management process is started in which, at predetermined timing such as timing after a printing start direction or timing after completion of a printing operation, a notification of supplement of ink is performed. Here, in a flowchart illustrated in FIG. 7, a detailed processing content of this third supplement management process is illustrated. In the third supplement management process, first, an ink residual amount of each ink tank 50 is calculated, and an ink residual amount state of each ink is determined based on the ink residual amount (Step S702). Next, it is determined whether or not the ink determined to be the end and the ink determined to be the near end are present (Step S704). In other words, in Step S704, only when at least one piece of ink determined to be the end and at least one piece of ink determined to be the near end are present, it is determined that both are present.

In a case where it is determined that both are present in Step S704, only the ink determined to be the end is selected (Step S706), and it is determined whether or not a plurality of pieces of the selected ink are present (Step S708). In addition, in the third supplement management process, the process after Step S708 is performed similar to the process after Step S508 of the first supplement management process.

In other words, in a case where it is determined that a plurality of pieces of ink are not present in Step S708, for the ink determined to be the end, display indicating the absence of the ink is performed on the display panel 14 (Step S710). Next, it is determined whether or not the supplement of the ink has been completed (Step S712). In a case where it is determined that the supplement of the ink has not been completed in Step S712, Step S712 is repeatedly performed. On the other hand, in a case where it is determined that the supplement of the ink has been completed in Step S712, the ink residual amount information is updated (Step S714). Thereafter, a recovery operation is performed (Step S716), and the third supplement management process ends.

On the other hand, in a case where it is determined that a plurality of pieces of ink are present in Step S708, ink that has not been supplemented among the plurality of pieces of ink determined to be the end is selected (Step S718). Then, for the selected ink, an indication representing absence of the ink is displayed on the display panel 14 (Step S720). Next, it is determined whether or not the supplement of the ink has been completed (Step S722).

In a case where it is determined that the supplement of the ink has not been completed in Step S722, Step S722 is repeatedly performed. On the other hand, in a case where it is determined that the supplement of the ink has been completed in Step S722, it is determined whether or not the supplement of all the ink (all the ink selected in Step S706) determined to be the end has been completed (Step S724). In Step S724, in a case where it is determined that the supplement of all the ink determined to be the end has not been completed, the process is returned to Step S718, and the subsequent process is performed. On the other hand, in a case where the supplement of all the ink determined to be the end has been completed in Step S724, the process proceeds to Step S714, and, after the ink residual amount information is updated, the process proceeds to Step S716, a recovery operation is performed, and the third supplement management process ends.

On the other hand, in a case where it is determined that both are not present in Step S704, it is determined whether ink determined to be the end is present (Step S726). In a case where it is determined that ink determined to be the end is not present in Step S726, the ink residual amount information is updated (Step S728), and the third supplement management process ends. On the other hand, in a case where it is determined that ink determined to be the end is present in Step S726, the process proceeds to Step S708, and a subsequent process is performed.

As described above, the ink jet printing apparatus 80 is configured to determine whether or not at least one piece of ink determined to be the end and at least one piece of ink determined to be the near end are present. Then, in a case where it is determined that both are present, the supplement of ink is urged only for the ink determined to be the end. Accordingly, also in a case where at least one piece of ink determined to be the end and at least one piece of ink determined to be near end are present, only the ink determined to be the end can be replaced.

In this way, the ink jet printing apparatus 80 manages such that supplement is performed first for ink that requires supplement more with the shape of each constituent member not changed. For this reason, according to the ink jet printing apparatus 80, compared to a form in which the occurrence of erroneous supplement is suppressed by changing the shape of the entry port for each color of ink, an increase in the cost can be suppressed. In addition, the occurrence of erroneous supplement can be suppressed.

Fourth Embodiment

Figure 8B:
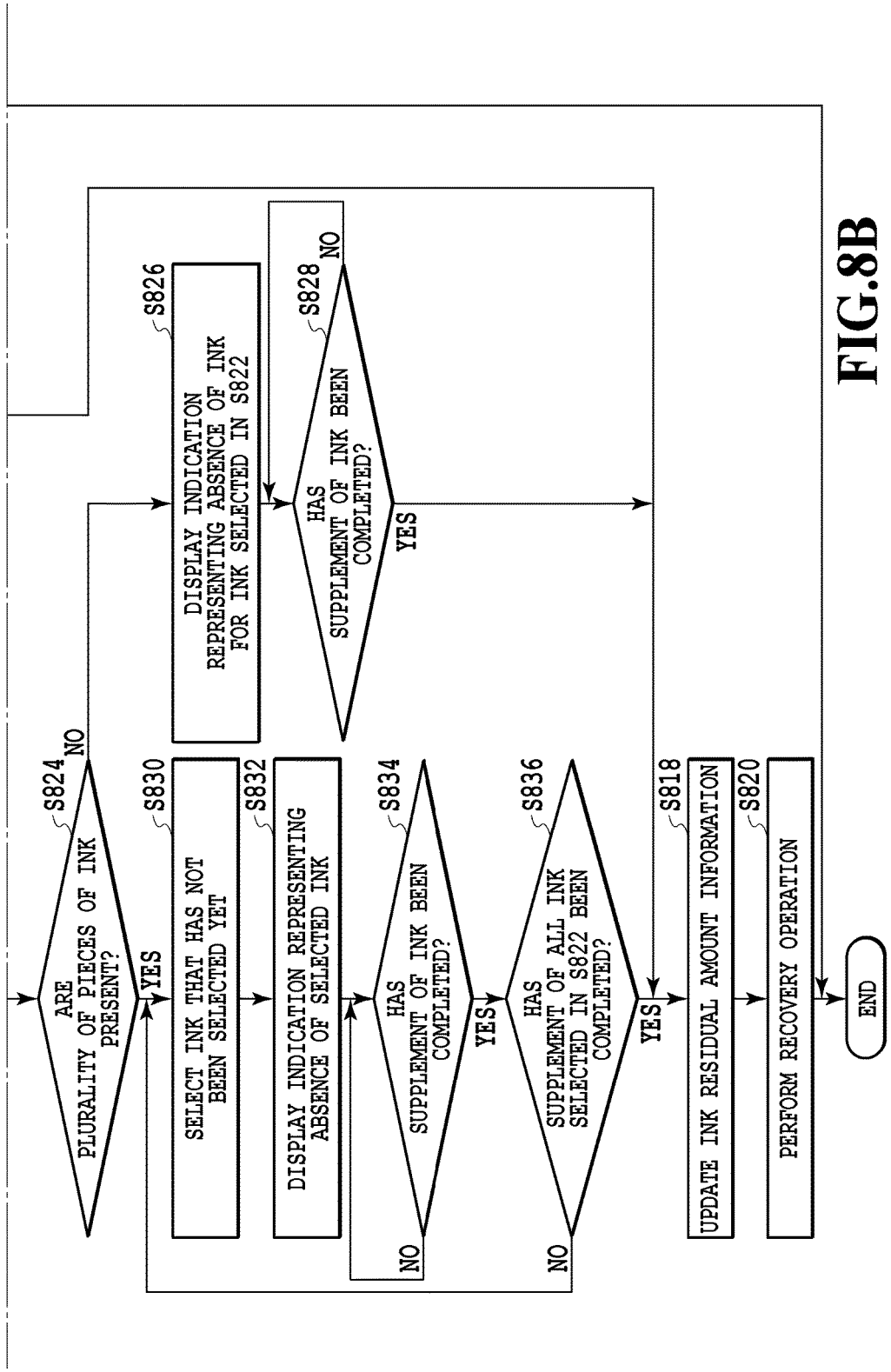

Next, an ink jet printing apparatus according to a fourth embodiment of the present invention will be described with reference to FIGS. 8A and 8B. In the following description, for a configuration that is the same as or corresponds to that of the ink jet printing apparatus 10, 70, or 80, the reference numeral described above will be used, and detailed description thereof will not be presented as is appropriate.

The ink jet printing apparatus 90 according to this fourth embodiment is different from the ink jet printing apparatus 10 only in the following points. A notification unit 64 determines ink determined to be the near end as ink (a printing liquid that is a second notification target) that is a notification target. For a plurality of pieces of ink determined to be the near end by a determination unit 62, the brightness levels are compared, and, in a case where a brightness level difference is determined to be a predetermined value or more, a display direction urging the supplement of ink is performed for predetermined ink. In addition, a brightness difference that is a determination criterion is stored in a storage unit 44. In other words, for one of combinations of pieces of ink of which a brightness level difference is a predetermined value or more, a notification urging the supplement of the ink is performed. In addition, in a case where a plurality of pieces of ink of which the brightness level difference is a predetermined value or more are present, the notification unit 64 performs a display direction urging the supplement of ink one at each time while checking the completion of a supplement operation.

In a case where three or more pieces of ink determined to be the near end are present, the determination unit 62 compares brightness levels of combinations of all the ink, determines whether or not a brightness level difference is a predetermined value or more, and determines a combination of pieces of ink of which the brightness level difference is a predetermined value or more based on a result of the determination. The brightness level of each ink is stored in the storage unit 44.

More specifically, in a case where three pieces A, B, and C of ink are determined to be the near end, brightness levels are compared for combinations of A-B, A-C, and B-C, and it is determined whether or not each brightness level difference is a predetermined value or more. Then, in a case where it is determined that a brightness level difference is the predetermined value or more for the combinations of A-B and A-C, only A is determined as ink of which the brightness level difference is the predetermined value or more. In addition, in a case where it is determined that a brightness level difference is the predetermined value or more for the combinations of A-B, A-C, and B-C, A, B, and C are determined as ink of which the brightness level difference is the predetermined value or more. Furthermore, in a case where it is determined that a brightness level difference is the predetermined value or more for the combinations of A-C and B-C, only C is determined as ink of which the brightness level difference is the predetermined value or more. In addition, in a case where it is determined that a brightness level difference is the predetermined value or more for the combinations of A-B and B-C, only B is determined as ink of which the brightness level difference is the predetermined value or more. In addition, in a case where it is determined that a brightness level difference is the predetermined value or more for a combinations other than the combinations described above, it is determined that there is no ink of which the brightness level difference is the predetermined value or more.

In this ink jet printing apparatus 90, a fourth supplement management process is started in which a notification of ink supplement is performed at predetermined timing such as timing after a printing start direction or timing after the completion of a printing operation. Here, in a flowchart illustrated in FIGS. 8A and 8B, a detailed processing content of this fourth supplement management process is illustrated. In the fourth supplement management process, first, the ink residual amount of each ink tank 50 is calculated, and the ink residual amount state of each ink is determined based on the ink residual amount (Step S802). Next, it is determined whether or not a plurality of pieces of ink determined to be the near end are present (Step S804).

In a case where it is determined that a plurality of pieces of ink determined to be the near end are not present in Step S804, the ink residual amount information is updated (Step S806), and the fourth supplement management process ends. On the other hand, in a case where it is determined that a plurality of pieces of ink determined to be the near end are present in Step S804, brightness levels of the plurality of pieces of ink determined to be the near end are compared with each other (Step S808). Thereafter, it is determined whether or not ink of which a brightness level difference is a predetermined value or more is present (Step S810). In a case where it is determined that ink of which a brightness level difference is the predetermined value or more is not present in Step S810, the process proceeds to Step S806, the ink residual amount information is updated, and the fourth supplement management process ends. On the other hand, in a case where it is determined that ink of which a brightness level difference is the predetermined value or more is present in Step S810, it is determined whether or not a plurality of pieces of ink of which a brightness level difference is the predetermined value or more are present (Step S812).

In a case where it is determined that a plurality of the pieces of ink are not present in Step S812, for ink of which a brightness level difference is the predetermined value or more, display indicating the absence of ink is performed on the display panel 14 (Step S814). In addition, in Step S814, in a case where it is determined that two pieces of ink determined to be the near end are present in Step S804, and it is determined that a brightness level difference between the two pieces of ink is the predetermined value or more in Step S810, display indicating the absence of ink is performed for one of the two pieces of ink. In other words, one of ink having a high brightness level and ink having a low brightness level is selected, and selection of one thereof is set in advance. In addition, in Step S814, a supplement operation completion button is additionally displayed, and the printing head 20 is moved up to the supplement position.

Then, Next, it is determined whether or not the supplement of ink has been completed (Step S816). A specific processing content of this Step S816 is similar to that of Step S512. In Step S816, in a case where it is determined that the supplement of ink has not been not completed, Step S816 is repeatedly performed. In addition, in Step S816, in a case where it is determined that the supplement of ink has been completed, the ink residual amount information is updated (Step S818). Thereafter, a recovery operation is performed (Step S820), and the fourth supplement management process ends. A specific processing content of Step S820 is similar to that of Step S516 described above.

In a case where it is determined that a plurality of pieces of ink are present in Step S812, ink having a smallest ink residual amount is selected (Step S822). The process after Step S822 is similar to the process of Steps S618 to S632 (including Steps S614 and S616) of the second supplement management process.

In other words, next, it is determined whether or not a plurality of pieces of selected ink are present (Step S824). In Step S824, in a case where it is determined that a plurality of pieces of ink are not present, in other words, in a case where it is determined that only one piece of ink is present, an indication representing that ink is absent is displayed on the display panel 14 for the ink selected in Step S822 (Step S826). Then, it is determined whether or not the supplement of ink has been completed (Step S828). In Step S828, in a case where it is determined that the supplement of ink has not been completed, Step S828 is repeatedly performed. On the other hand, in Step S828, in a case where it is determined that the supplement of ink has been completed, the process proceeds to Step S818, and the ink residual amount information is updated. Thereafter, the process proceeds to Step S820, a recovery operation is performed, and the fourth supplement management process ends.

In Step S824, in a case where it is determined that a plurality of pieces of selected ink are present, ink that has not been completed is selected from among the ink selected in Step S822 (Step S830). Then, an indication representing the absence of ink is displayed on the display panel 14 for the selected ink (Step S832). Next, it is determined whether or not the supplement of ink has been completed (Step S834).

In Step S834, in a case where it is determined that the supplement of ink has not been completed, Step S834 is repeatedly performed. On the other hand, in Step S834, in a case where it is determined that the supplement of ink has been completed, it is determined whether or not the supplement of all the ink selected in Step S822 has been completed (Step S836). In Step S836, in a case where it is determined that the supplement of all the ink selected in Step S822 has not been completed, the process is returned to Step S830, and a subsequent process is performed. On the other hand, in Step S836, in a case where it is determined that the supplement of all the ink selected in Step S822 has been completed, the process proceeds to the process of Step S818, and the ink residual amount information is updated. Thereafter, the process proceeds to Step S820, a recovery operation is performed, and the fourth supplement management process ends.

In addition, in the fourth supplement management process, it may be configured such that the color system of each ink can be determined, and, for pieces of ink having mutually-different color systems, display indicating the absence of ink is not simultaneously performed. In other words, in this case, the color systems of a plurality of pieces of ink determined to be the near end are determined, and one color system out of the mutually-different color systems, display indicating the absence of ink is performed. More specifically, the color systems of a plurality of pieces of ink determined to be the near end are determined in Step S808, and ink of one color system is selected in Step S810. In addition, at this time, in a case where a plurality of pieces of ink of one color system are present (for example, cyan and light cyan), since there is low influence of a mixed color, display indicating the absence of ink may be simultaneously performed on the display panel 14. In this way, a time required for the supplement of ink can be shortened.

As described above, the ink jet printing apparatus 90 compares the brightness levels of a plurality of pieces of ink determined to be the near end and determines whether or not pieces of ink of which a brightness level difference is the predetermined value or more are present. Then, for the pieces of ink of which a brightness level difference is the predetermined value or more, the supplement of the ink is urged. In this way, in the ink jet printing apparatus 90, for pieces of ink having high influence of a mixed color, the pieces of ink are not simultaneously supplemented.

In this way, the ink jet printing apparatus 90 is configured to urge the supplement of ink one at each time in a case where the influence of a mixed color is high between pieces of ink required to be supplemented with the shape of each constituent member unchanged. For this reason, according to the ink jet printing apparatus 90, compared to a form in which the occurrence of erroneous supplement is suppressed by changing the shape of the entry port for each color of ink, an increase in the cost can be suppressed. In addition, the occurrence of erroneous supplement of ink having high influence of a mixed color can be suppressed.

Other Embodiments

In addition, the embodiment described above may be configured as represented in the following (1) to (8).

Figure 9:
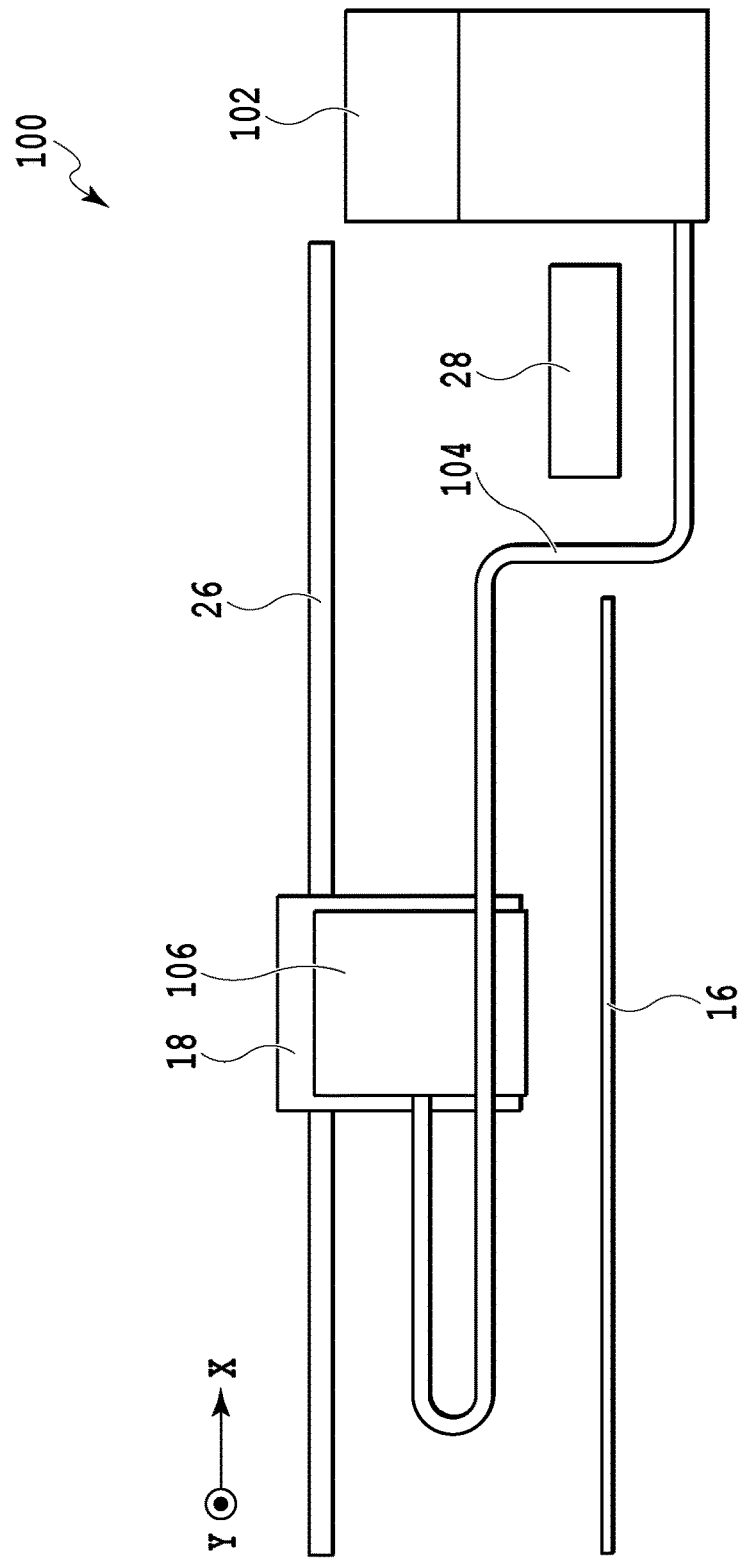
FIG. 9 is a schematic diagram of a main part of an ink jet printing apparatus of a modified example of the present invention.

(1) The printing head 20 is not limited to a configuration which the ink tank 50 can be attached to or detached from. For example, as an ink jet printing apparatus 100 illustrated in FIG. 9, ink stored in a main tank 102 may be supplied to a printing head 106 through a tube 104. In FIG. 9, the reference numeral used above is used for a configuration that is the same as that of the ink jet printing apparatus 10.

Figure 10A:
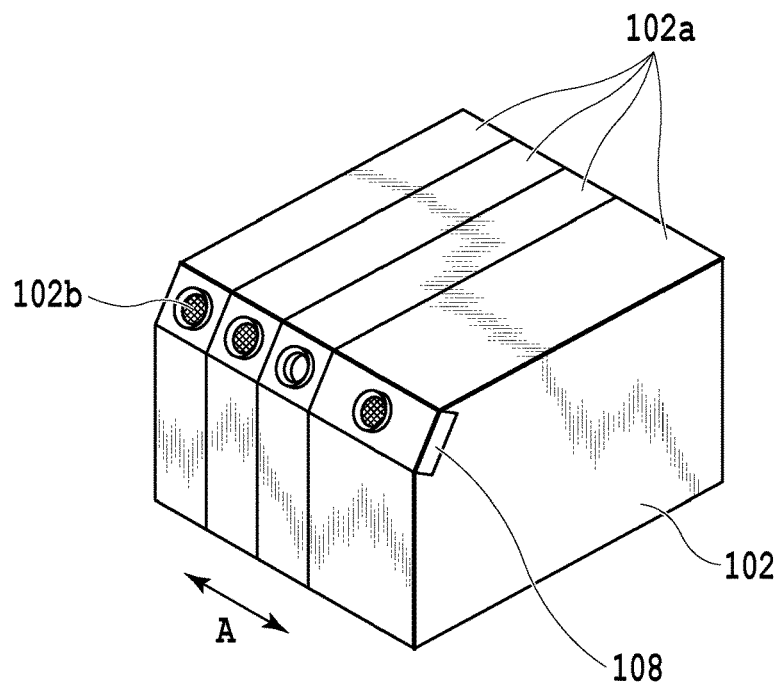
FIG. 10A is a schematic configuration perspective view of a main tank.
Figure 10B:
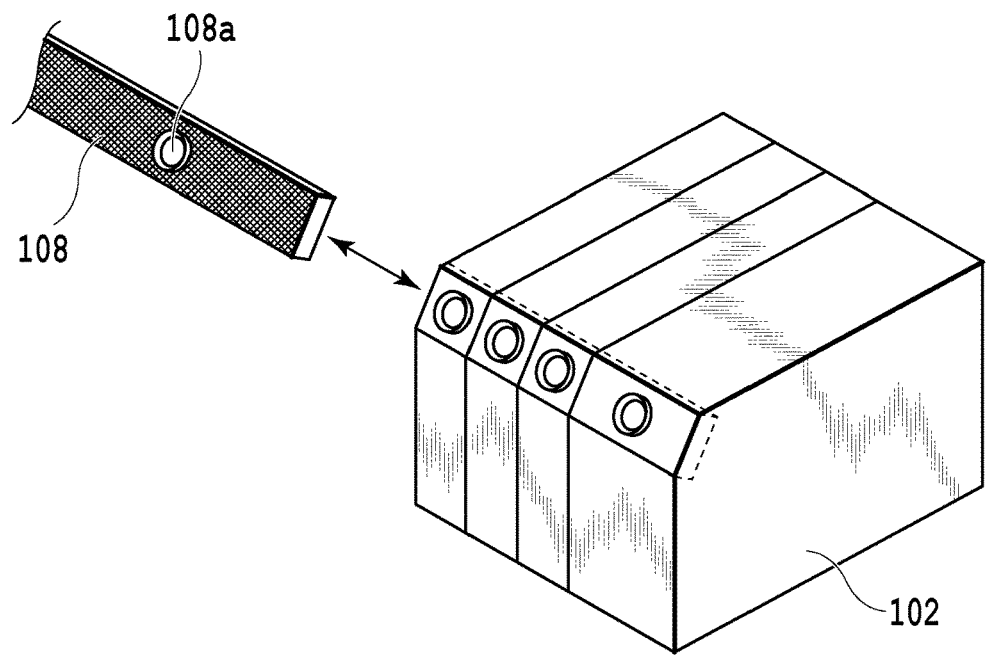
FIG. 10B is a schematic diagram that illustrates a shielding plate inserted into the main tank.

The main tank 102, as illustrated in FIG. 10A, is configured such that a plurality of tanks 102a capable of independently storing ink of a plurality of colors are continuously disposed. In addition, near an upper end portion of the side face, an injection hole 102b used for injecting ink into each tank 102a is formed. Furthermore, as illustrated in FIG. 10B, on the inner side of each injection hole 102b, a shielding plate 108 is inserted, and this shielding plate 108 is arranged to be able to slide in the direction of an arrow A by a drive unit not illustrated in the drawing. In addition, in the shielding plate 108, one through hole 108a is formed, and communicates with one of a plurality of injection holes 102b as the shielding plate 108 is moved. Accordingly, in the tank 102a in which the injection hole 102b communicating with the through hole 108a is positioned, an inner space and an outer space communicate with each other. In addition, it may be configured such that, inside each tank 102a of the main tank 102, a sensor capable of detecting the amount of stored ink is arranged, and the residual amount of the ink is directly detected based on a signal (for example, a change in the current) transmitted from this sensor.

In a case where the first to fourth supplement management processes are performed, when an indication representing the absence of ink is displayed, the ink jet printing apparatus 100 moves the shielding plate 108 such that the injection hole 102b of the tank 102a, which stores ink, displaying an indication the absence of ink and the through hole 108a communicate with each other. In FIG. 10A, a state is formed in which the shielding state of the injection hole 102b of the tank 102a disposed second from the front side of the sheet is released by the through hole 108a of the shielding plate 108, and the inner space and the outer space communicate with each other.

More specifically, the moving of the shielding plate 108 (shielding member) is performed when the process of Steps S510 and S524 is performed in the first supplement management process. In addition, in the second supplement management process, the moving thereof is performed when the process of Steps S610, S622, and S630 is performed in the second supplement management process. Furthermore, in the third supplement management process, the moving thereof is performed when the process of Steps S710 and S720 is performed in the third supplement management process. In addition, in the fourth supplement management process, the moving thereof is performed when the process of Steps S814, S826, and S832 is performed in the fourth supplement management process.

In each process, based on information specifying ink, a drive unit (not illustrated in the drawing) is driven by the movement unit 69, and the shielding plate 108 is moved to a position at which the injection hole 102b of the tank 102a storing ink specified by the information and the through hole 108a communicate with each other.

In addition, in the main tank 102, without arranging the shielding plate 108, a cap (sealing member) that can be attached/detached to/from each injection hole 102b may be arranged. At this time, the cap is configured to be locked or unlocked according to the control of the movement unit 69. In a case where the first to fourth supplement management processes are performed, when an indication representing the absence of ink is displayed, the cap of the injection hole 102b of the tank 102a storing ink for which the indication representing the absence of ink is displayed is unlocked. Accordingly, only the injection hole 102b is in a state in which the sealing state using the cap can be released. For this reason, only the ink for which an indication representing the absence of ink is displayed can be physically supplemented with ink, and the occurrence of erroneous supplement of the ink can be reliably suppressed.

(2) The supplement management process (one of the first to fourth supplement management processes) performing a notification of supplement of ink so as to enable the user not to make a supplement mistake and a normal supplement management process performing a conventional notification of supplement of ink may be configured to be displayed. More specifically, on the display panel 14, for example, a screen as illustrated in FIG. 11A is displayed, and one of the supplement management processes to be performed can be selected by the user. In addition, in the case illustrated in FIG. 11A, in a case where "Yes" is selected, the first supplement management process (or one of the second to fourth supplement management processes) is performed, and, in a case where "No" is selected, a normal supplement management process is performed. The timing at which the selection screen is displayed on the display panel 14, for example, may be at the time of initial setting or at the time of selecting a button displayed on the display panel 14, and the timing may be any other timing.

Figure 12:
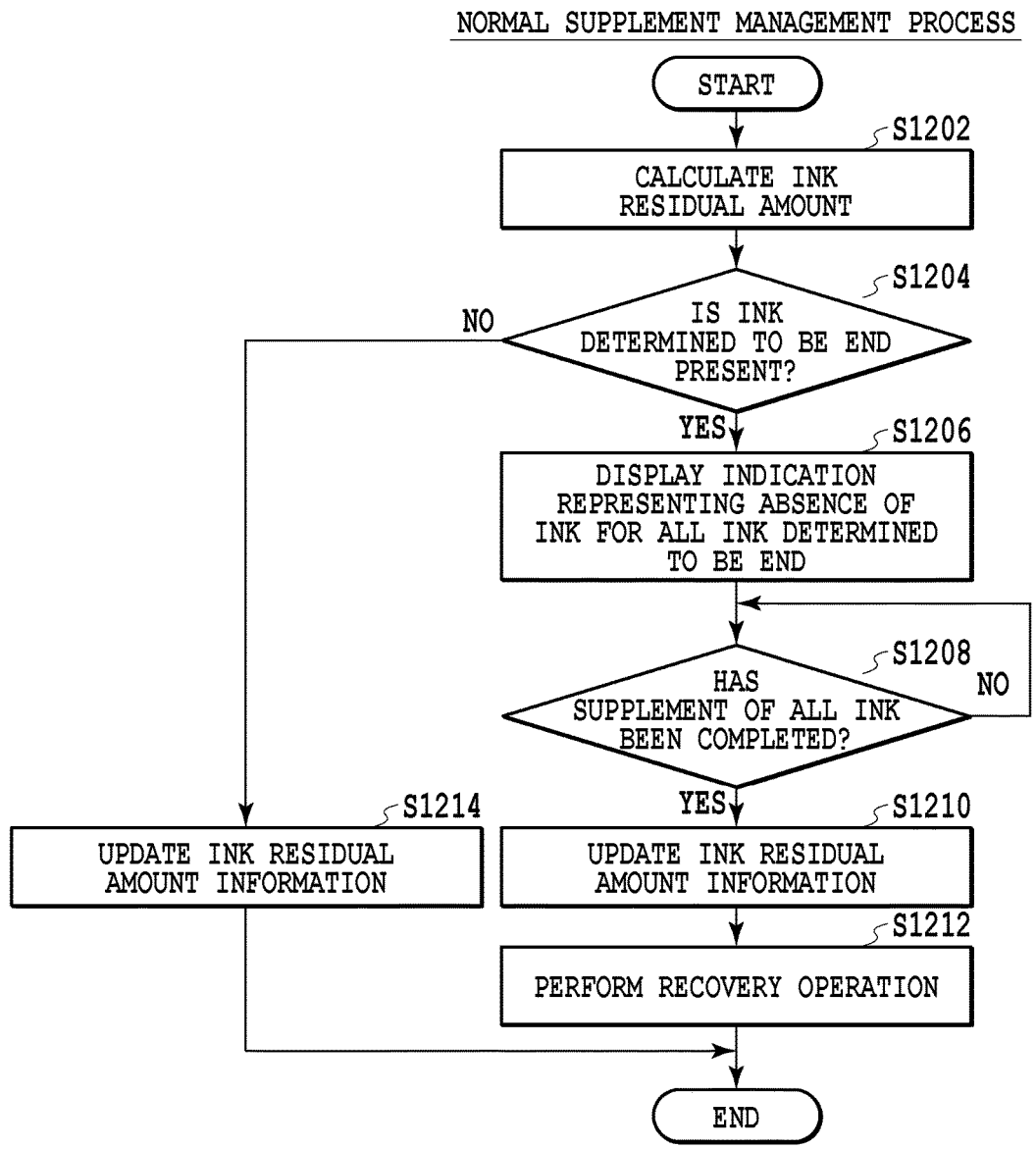
FIG. 12 is a flowchart that illustrates the process routine of a normal supplement management process.

In the normal supplement management process, for example, a process as illustrated in FIG. 12 is performed. In other words, at predetermined timing, the ink residual amount is calculated, and the ink residual amount state of each ink is determined based on the ink residual amount (Step S1202). Next, it is determined whether ink determined to be the end is present (Step S1204), and, in a case where the presence is determined, for all the ink determined to be the end, an indication representing the absence of ink is displayed on the display panel 14 (Step S1206). Thereafter, it is determined whether the supplement of all the ink has been completed (Step S1208), and, in a case where it is determined that the supplement of the ink has been completed, the ink residual amount information is updated (Step S1210). Then, a recovery operation is performed (Step S1212), and the normal supplement management process ends. On the other hand, in a case where it is determined that the ink determined to be the end is not present in Step S1204, the ink residual amount information is updated (Step S1214), and the normal supplement management process ends. In addition, in a case where it is determined that the supplement of all the ink has not been completed in Step S1208, this process is repeatedly performed until the supplement is determined to be completed.

By configuring one of the first to fourth supplement management processes and the normal supplement management process to be selectable, the user can select prevention of a mistake of ink supplement (according to the first to fourth supplement management processes) or shortening of the ink supplement time (according to the normal supplement management process).

(3) The printing head 20 may be configured to be able to lock or unlock each ink tank 50. In such a case, when an indication representing the absence of ink is displayed on the display panel 14, the ink tank 50 of ink other than the displayed ink is locked, and the ink tank 50 of the displayed ink is unlocked. In this way, the supplement of ink cannot be physically performed, and a supplement mistake can be prevented more reliably.

(4) By arranging a sensor that can read a chip disposed in each ink tank 50 in the printing head 20 and reading information stored in the chip using the sensor, the completion of supplement (replacement) of ink may be automatically detected.

(5) When the ink residual amount is each threshold, which is arranged in a stepped manner, or less, in a case where a warning display according to the ink residual amount can be performed, a text or the like that is displayed is not particularly limited. In addition, the number of printable sheets for an image that is previously printed may be displayed on the display panel 14.

(6) An ink jet printing apparatus to which the present invention can be applied is not limited to an ink jet printing apparatus of so-called a serial scan type like the embodiment described above. For example, the present invention can be applied also to an ink jet printing apparatus of so-called a full line type using a printing head capable of ejecting ink over all the width in the widthwise direction of a conveyed printing medium. In addition, the present invention is not limited to an ink jet printing apparatus of so-called a sheet feed type like the embodiment described above but can be applied also to an ink jet printing apparatus of a flat-bed type.

(7) A printing apparatus to which the present invention can be applied is not limited to the ink jet printing apparatus described above but can be applied to various printing apparatuses performing printing by applying ink to a printing medium.

(8) The function of the management unit 46 can be added to a host apparatus such as a personal computer connected to the ink jet printing apparatus. In other words, a part or all of the functions of the notification device according to the present invention can be configured in the ink jet printing apparatus and the host apparatus. The display device used for displaying an indication representing the absence of ink may be the display panel 14 disposed in the ink jet printing apparatus or the host apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-093327, filed May 6, 2016, which is hereby incorporated by reference herein in its entirety.

What is claimed is:

1. A notification device comprising:
an acquisition unit that acquires information relating to a residual amount of each of a plurality of printing liquids supplied to a printing apparatus;
a determination unit that determines whether or not each of the plurality of printing liquids is a printing liquid of a notification target of which a residual amount is a predetermined amount or less based on the information acquired by the acquisition unit; and
a notification unit that, in a case where a plurality of printing liquids of the notification target determined by the determination unit are present, notifies of information relating to the residual amount of a predetermined printing liquid satisfying a predetermined condition among the plurality of printing liquids of the notification target,
wherein the predetermined amount includes a first predetermined amount and a second predetermined amount greater than the first predetermined amount,
wherein the determination unit determines whether or not each of the plurality of printing liquids is a printing liquid of a first notification target of the first predetermined amount or less and determines whether or not each of the plurality of printing liquids is a printing liquid of a second notification target of the second predetermined amount or less, and
wherein the notification unit, in a case where a plurality of printing liquids of the first notification target determined by the determination unit are present, notifies of the information relating to the residual amount for a predetermined printing liquid satisfying the predetermined condition among the plurality of printing liquids of the first notification target with priority and, in a case where a plurality of printing liquids of the second notification target determined by the determination unit are present, notifies of the information relating to the residual amount for a predetermined printing liquid satisfying the predetermined condition among the plurality of printing liquids of the second notification target with priority.

2. The notification device according to claim 1, wherein the notification unit notifies of information relating to the residual amount for one printing liquid satisfying the predetermined condition among the plurality of printing liquids of the notification target.

3. The notification device according to claim 2, further comprising a detection unit that detects completion of supplement of a printing liquid,
wherein the notification unit, after detecting the completion of the supplement by using the detection unit, notifies of the information relating to the residual amount for another printing liquid satisfying the predetermined condition.

4. The notification device according to claim 1, wherein, in the predetermined condition, a printing liquid having a small residual amount among the plurality of printing liquids of the notification target is prioritized.

5. The notification device according to claim 1, wherein, in the predetermined condition, a printing liquid having a large use amount or a high use frequency among the plurality of printing liquids of the notification target is prioritized.

6. The notification device according to claim 1, wherein, in the predetermined condition, a printing liquid having a high brightness level among the plurality of printing liquids of the notification target is prioritized.

7. The notification device according to claim 1, wherein, in the predetermined condition, one of a combination of printing liquids of which a brightness level difference is a predetermined value or more among the plurality of printing liquids of the notification target is prioritized.

8. The notification device according to claim 1, wherein, in the predetermined condition, one of a combination of printing liquids having mutually-different color systems among the plurality of printing liquids of the notification target is prioritized.

9. The notification device according to claim 1, wherein, when a plurality of printing liquids of a same color system are present among the plurality of printing liquids of the notification target, the notification unit simultaneously notifies of the information relating to the residual amounts for the plurality of printing liquids of the same color system.

10. The notification device according to claim 1, wherein, in a case where a printing liquid of the first notification target and a printing liquid of the second notification target are determined to be present by the determination unit, the notification unit notifies of the information relating to the residual amount for the printing liquid of the first notification target, but the notification unit does not notify of the information relating to the residual amount at the same timing for the printing liquid of the second notification target.

11. The notification device according to claim 1, wherein the information relating to the residual amount is information for causing a display panel to display a necessity for supplementing the printing liquid whose residual amount is equal to or less than the predetermined amount.

12. The notification device according to claim 1, wherein the notification unit can perform a first notification notifying of information relating to the residual amount for the predetermined printing liquid among the plurality of printing liquids of the notification target and a second notification notifying of information relating to the residual amount for all of the plurality of printing liquids of the notification target, and the first notification and the second notification can be selected by a user on a display panel.

13. The notification device according to claim 1, further comprising a control unit that performs a recovery operation when supplement of all of the plurality of printing liquids of the notification target is completed.

14. The notification device according to claim 1,
wherein the printing liquids are independently stored in a housing unit, and
wherein the housing unit is a unit which tanks storing the printing liquids can be attached to or detached from and supplements the printing liquids by replacing the tanks.

15. The notification device according to claim 1,
wherein the printing liquids are independently stored in a housing unit, and
wherein the housing unit is a unit in which tanks storing the printing liquids are continuously disposed and supplements the printing liquids by injecting the printing liquids into the tanks.

16. The notification device according to claim 15,
wherein the housing unit includes shielding members or sealing members in injection holes used for supplementing the printing liquids to the tanks, and
wherein the shielding members or the sealing members release a shielded state or a sealed state of only an injection hole of a tank storing a printing liquid for which the information relating to the residual amount is notified.

17. The notification device according to claim 1, wherein the information relating to the residual amount is information for causing a display panel to display an order for supplementing the printing liquid whose residual amount is equal to or less than the predetermined amount.

18. A printing apparatus performing printing by applying a printing liquid onto a printing medium, the printing apparatus comprising a notification device,
wherein the notification device includes:
an acquisition unit that acquires information relating to a residual amount of each of a plurality of supplied printing liquids;
a determination unit that determines whether or not each of the plurality of printing liquids is a printing liquid of a notification target of which a residual amount is a predetermined amount or less based on the information acquired by the acquisition unit; and
a notification unit that, in a case where a plurality of printing liquids of the notification target determined by the determination unit are present, notifies of information relating to the residual amount of a predetermined printing liquid satisfying a predetermined condition among the plurality of printing liquids of the notification target,
wherein the predetermined amount includes a first predetermined amount and a second predetermined amount greater than the first predetermined amount,
wherein the determination unit determines whether or not each of the plurality of printing liquids is a printing liquid of a first notification target of the first predetermined amount or less and determines whether or not each of the plurality of printing liquids is a printing liquid of a second notification target of the second predetermined amount or less, and
wherein the notification unit, in a case where a plurality of printing liquids of the first notification target determined by the determination unit are present, notifies of the information relating to the residual amount for a predetermined printing liquid satisfying the predetermined condition among the plurality of printing liquids of the first notification target with priority and, in a case where a plurality of printing liquids of the second notification target determined by the determination unit are present, notifies of the information relating to the residual amount for a predetermined printing liquid satisfying the predetermined condition among the plurality of printing liquids of the second notification target with priority.

* * * * *